US012561377B2

(12) United States Patent
Putman et al.

(10) Patent No.: US 12,561,377 B2
(45) Date of Patent: Feb. 24, 2026

(54) SELECTIVELY DISTRIBUTING VISUALIZATIONS USING THIN CLIENTS

(71) Applicant: Rockwell Automation Technologies, Inc., Mayfield Heights, OH (US)

(72) Inventors: Nicholas M. Putman, Dexter, MI (US); Matthew B. Hortman, Swanee, GA (US); Randy A. Cannady, Canton, GA (US); Travis J. Seagert, Gainesville, GA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 257 days.

(21) Appl. No.: 18/368,452

(22) Filed: Sep. 14, 2023

(65) Prior Publication Data

US 2025/0094499 A1    Mar. 20, 2025

(51) Int. Cl.
*G06F 16/904*    (2019.01)
*H04L 9/40*    (2022.01)

(52) U.S. Cl.
CPC ............ *G06F 16/904* (2019.01); *H04L 63/08* (2013.01); *H04L 63/107* (2013.01)

(58) Field of Classification Search
CPC ...... G06F 16/904; H04L 63/08; H04L 63/107
See application file for complete search history.

(56) References Cited

U.S. PATENT DOCUMENTS

| | | | |
|---|---|---|---|
| 10,404,474 B1 | 9/2019 | Caseres et al. | |
| 2006/0107062 A1* | 5/2006 | Fauthoux .............. | H04L 9/3226 |
| | | | 713/182 |

| | | | |
|---|---|---|---|
| 2009/0089709 A1 | 4/2009 | Baier et al. | |
| 2010/0325076 A1 | 12/2010 | Paulk et al. | |
| 2012/0198547 A1* | 8/2012 | Fredette .............. | G06F 3/04817 |
| | | | 726/19 |
| 2012/0328101 A1* | 12/2012 | Lakshminarayanan ..................... | H04L 63/0823 |
| | | | 380/258 |
| 2013/0074165 A1* | 3/2013 | Dhaene .............. | H04L 63/0815 |
| | | | 726/5 |
| 2014/0108985 A1 | 4/2014 | Scott et al. | |
| 2014/0325594 A1* | 10/2014 | Klein .................... | H04W 12/30 |
| | | | 726/2 |
| 2016/0274558 A1 | 9/2016 | Strohmenger et al. | |
| 2017/0078262 A1* | 3/2017 | Riddick .................. | H04L 63/08 |
| 2017/0090970 A1 | 3/2017 | Baskaran et al. | |
| 2018/0075152 A1 | 3/2018 | Zhang | |
| 2018/0081664 A1 | 3/2018 | Sagiraju | |
| 2018/0299863 A1* | 10/2018 | Caine ..................... | H04L 67/12 |

(Continued)

FOREIGN PATENT DOCUMENTS

| | | | | |
|---|---|---|---|---|
| EP | 2550620 B1 * | 7/2014 | ............. | G06F 21/34 |

*Primary Examiner* — Javier O Guzman
(74) *Attorney, Agent, or Firm* — Fletcher Yoder, P.C.

(57) ABSTRACT

A system may include a computing system communicatively coupled to a plurality of client devices. The computing system may receive an indication of an event-based trigger for deploying visualization content and retrieve visualization content associated with the event-based trigger. The visualization content may be generated via a first client device of the plurality of client devices. The computing system may then identify a user associated with the-event based trigger, identify a second client device of the plurality of client devices associated with the user, and send the visualization content to the second client device.

18 Claims, 20 Drawing Sheets

(56)  References Cited

U.S. PATENT DOCUMENTS

| | | |
|---|---|---|
| 2018/0331969 A1 | 11/2018 | Chen et al. |
| 2019/0069178 A1* | 2/2019 | Wu ........................ H04L 67/141 |
| 2019/0101884 A1 | 4/2019 | Miller et al. |
| 2019/0102456 A1 | 4/2019 | Miller et al. |
| 2019/0132393 A1 | 5/2019 | Ring et al. |
| 2020/0027210 A1 | 1/2020 | Haemel et al. |
| 2020/0032003 A1 | 1/2020 | Ariura et al. |
| 2020/0076685 A1 | 3/2020 | Vaidya et al. |
| 2020/0174842 A1 | 6/2020 | Wang et al. |
| 2020/0192692 A1 | 6/2020 | Ghag et al. |
| 2020/0320034 A1 | 10/2020 | Stawikowski et al. |
| 2021/0096543 A1 | 4/2021 | Stump et al. |
| 2021/0382727 A1 | 12/2021 | Vigil et al. |
| 2022/0179398 A1* | 6/2022 | Putman ..................... G06F 8/60 |
| 2024/0192842 A1* | 6/2024 | Sedouram ............. G06F 3/0482 |

* cited by examiner

Figure 4:
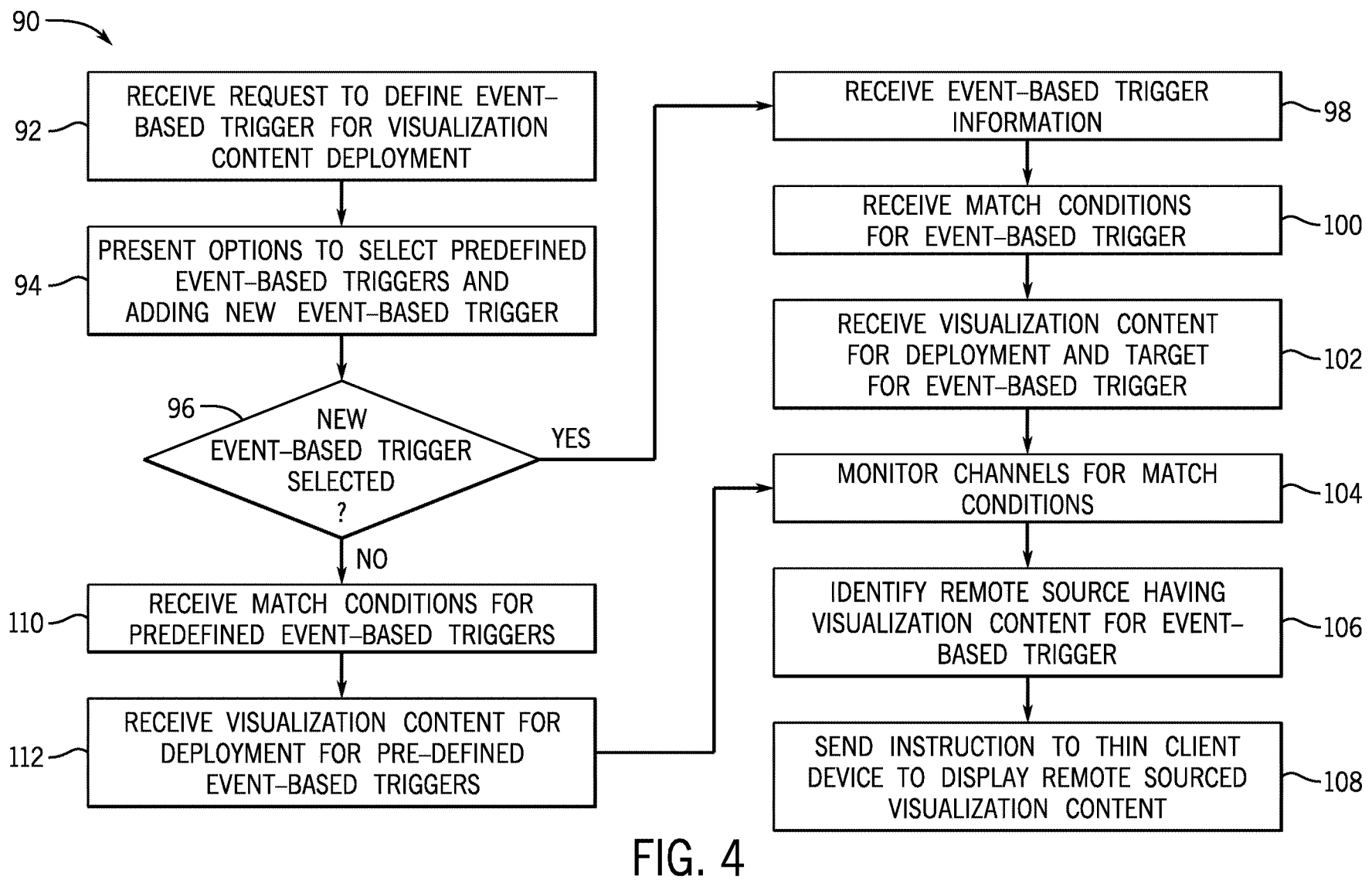

RECEIVE EVENT-BASED TRIGGER INFORMATION — 98

RECEIVE MATCH CONDITIONS FOR EVENT-BASED TRIGGER — 100

RECEIVE VISUALIZATION CONTENT FOR DEPLOYMENT AND TARGET FOR EVENT-BASED TRIGGER — 102

MONITOR CHANNELS FOR MATCH CONDITIONS — 104

IDENTIFY REMOTE SOURCE HAVING VISUALIZATION CONTENT FOR EVENT-BASED TRIGGER — 106

SEND INSTRUCTION TO THIN CLIENT DEVICE TO DISPLAY REMOTE SOURCED VISUALIZATION CONTENT — 108

RECEIVE REQUEST TO DEFINE EVENT-BASED TRIGGER FOR VISUALIZATION CONTENT DEPLOYMENT — 92

PRESENT OPTIONS TO SELECT PREDEFINED EVENT-BASED TRIGGERS AND ADDING NEW EVENT-BASED TRIGGER — 94

NEW EVENT-BASED TRIGGER SELECTED ? — 96

YES

NO

RECEIVE MATCH CONDITIONS FOR PREDEFINED EVENT-BASED TRIGGERS — 110

RECEIVE VISUALIZATION CONTENT FOR DEPLOYMENT FOR PRE-DEFINED EVENT-BASED TRIGGERS — 112

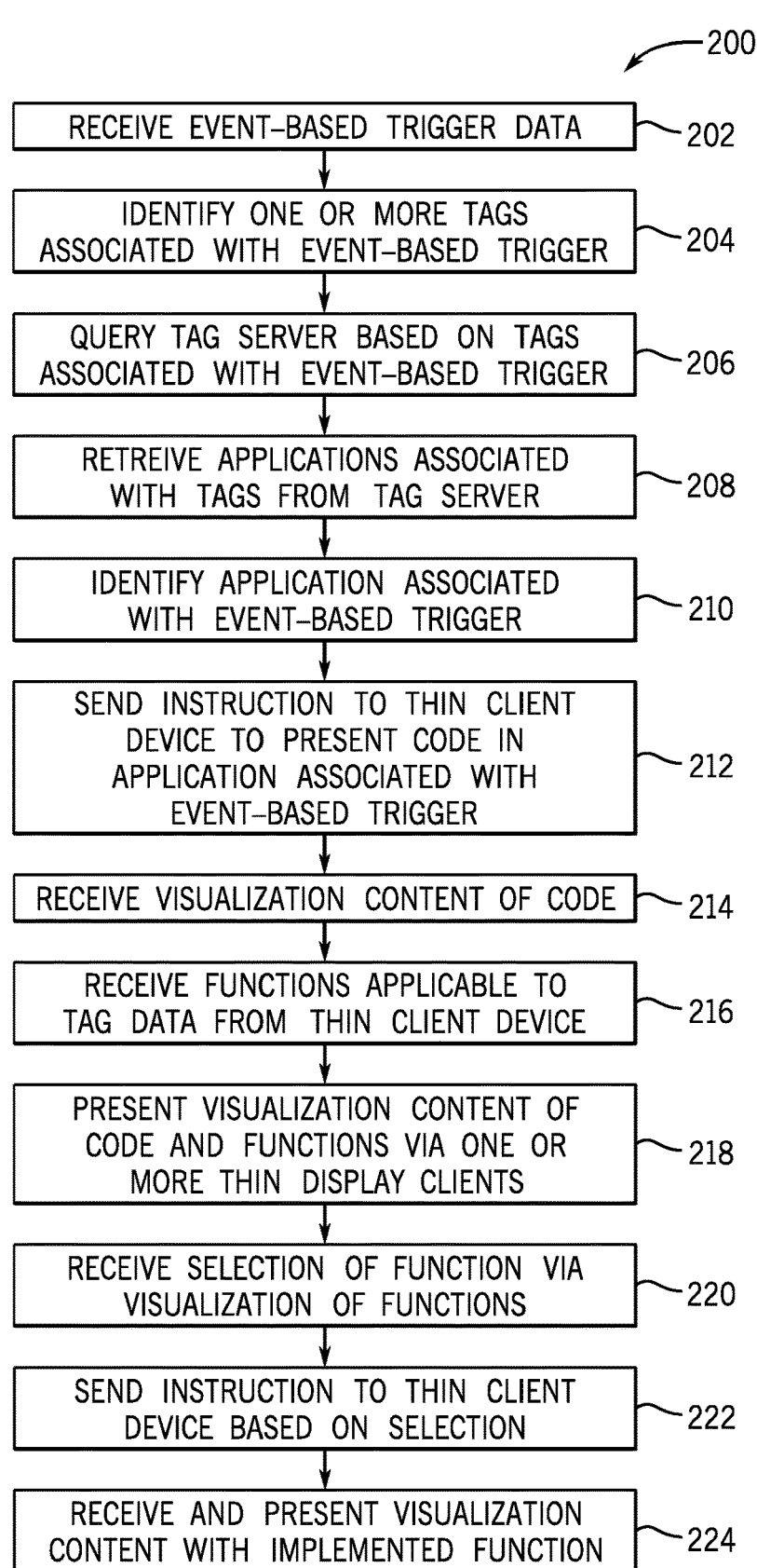

200

RECEIVE EVENT-BASED TRIGGER DATA — 202

IDENTIFY ONE OR MORE TAGS ASSOCIATED WITH EVENT-BASED TRIGGER — 204

QUERY TAG SERVER BASED ON TAGS ASSOCIATED WITH EVENT-BASED TRIGGER — 206

RETREIVE APPLICATIONS ASSOCIATED WITH TAGS FROM TAG SERVER — 208

IDENTIFY APPLICATION ASSOCIATED WITH EVENT-BASED TRIGGER — 210

SEND INSTRUCTION TO THIN CLIENT DEVICE TO PRESENT CODE IN APPLICATION ASSOCIATED WITH EVENT-BASED TRIGGER — 212

RECEIVE VISUALIZATION CONTENT OF CODE — 214

RECEIVE FUNCTIONS APPLICABLE TO TAG DATA FROM THIN CLIENT DEVICE — 216

PRESENT VISUALIZATION CONTENT OF CODE AND FUNCTIONS VIA ONE OR MORE THIN DISPLAY CLIENTS — 218

RECEIVE SELECTION OF FUNCTION VIA VISUALIZATION OF FUNCTIONS — 220

SEND INSTRUCTION TO THIN CLIENT DEVICE BASED ON SELECTION — 222

RECEIVE AND PRESENT VISUALIZATION CONTENT WITH IMPLEMENTED FUNCTION — 224

RECEIVE POD FOR EXECUTING CONTAINER  ~332

PULL CONTAINER IMAGE BASED ON POD  ~334

EXECUTE CONTAINER IMAGE TO
GENERATE VISUALIZATION CONTENT  ~336

DEPLOY PACKAGE TO AUTOMATION
COMPONENT  ~338

RECEIVE DATASETS FROM
AUTOMATION COMPONENTS  ~340

GENERATE VISUALIZATION CONTENT
BASED ON DATASETS  ~342

SEND VISUALIZATION CONTENT TO
THIN-CLIENT HMIs  ~344

SELECTIVELY DISTRIBUTING VISUALIZATIONS USING THIN CLIENTS

BACKGROUND

This disclosure relates generally to human machine interfaces, such as those used in industrial automation systems. More particularly, the disclosure relates to delivering visualization content based on user-defined events via thin client devices.

Advances in automation systems have enabled coordinated control and monitoring of a wide range of machines and processes. Modern industrial automation is commonly based on computer control of motors, valves, and other actuators based upon preset programming, modeling, sensing and feedback of many different parameters from sensors and monitors, typically depending upon the machine or process being controlled. Operators interact with the systems in control rooms, but increasingly by local or mobile devices that may be positioned in any convenient location.

In such applications, human operators use some type of interface with which to interact (e.g., monitor, control, analyze, examine) the machine or process. In some industrial automation environments, such interaction is often performed via a human machine interface, sometimes referred to as an "HMI". These often are based on screens that are pre-defined and stored on a monitor-like device. The screens may show diagrams of the controlled machine or process, components, values, process flows, and so forth. In some cases, the screens allowed for the user to interact via touching one or more designated locations on the screen, or through other input devices. Different screens or pages can often be accessed in this way, such as to view different aspects of the machine or process, feedback, process data, performance data, and so forth. With this in mind, improvements with regard to defining events to trigger generating and deploying visualization content are still desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a computing system communicatively coupled to a plurality of client devices. The computing system may receive an indication of an event-based trigger for deploying visualization content and retrieve visualization content associated with the event-based trigger. The visualization content may be generated via a first client device of the plurality of client devices. The computing system may then identify a user associated with the-event based trigger, identify a second client device of the plurality of client devices associated with the user, and send the visualization content to the second client device.

In another embodiment, a non-transitory computer-readable medium may include computer-executable instructions that, when executed, may cause at least one processor to perform operations that may include receiving an indication of an event-based trigger for deploying visualization content. The operations may also include retrieving visualization content associated with the event-based trigger, such that the visualization content may be generated via a first client device of a plurality of client devices communicatively coupled to the at least one processor. The operations may also include identifying a user associated with the-event based trigger, identifying a second client device of the plurality of client devices associated with the user, and sending the visualization content to the second client device.

In another embodiment, a method may include receiving, via a computing system, an indication of an event-based trigger for deploying visualization content and retrieving visualization content associated with the event-based trigger. The visualization content may be generated via a first client device of a plurality of client devices communicatively coupled to the at least one processor. The method may also involve identifying a user associated with the-event based trigger, identifying a second client device of the plurality of client devices associated with the user, and sending the visualization content to the second client device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 4 is a flow chart of a method for deploying visualization content based on user-defined events detected by the visualization management system, in accordance with embodiments described herein;

FIG. 13 is a flow chart of a method for dynamically accessing control code associated with user-defined events detected by the visualization management system, in accordance with embodiments described herein;

DETAILED DESCRIPTION

Figure 1:
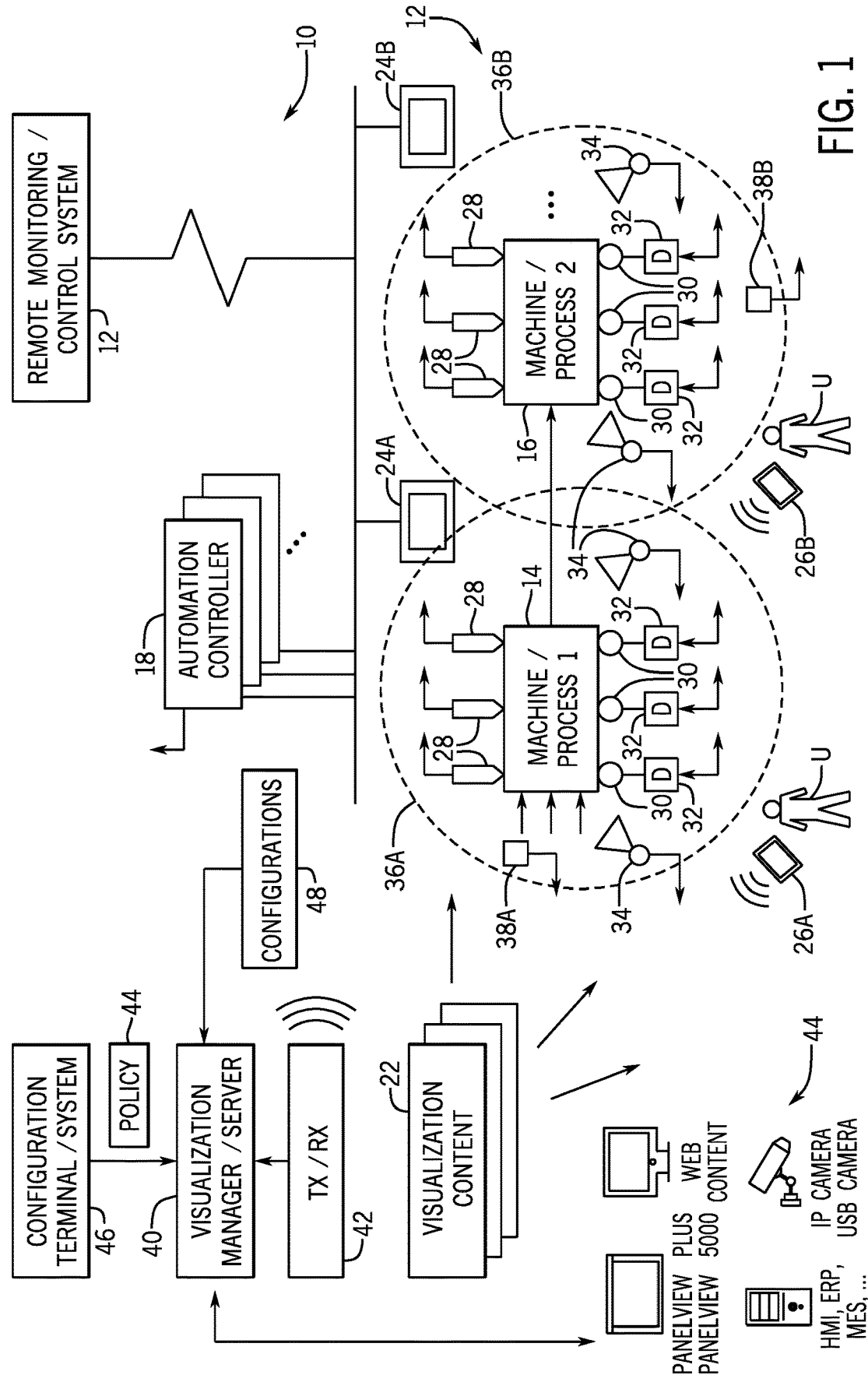
FIG. 1 is a diagrammatical representation of an example automation system for monitoring and controlling a machine or process and utilizing various visualization technologies, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As used herein, the terms "container nodes," "host devices," and "container hosts" may be used interchangeably. One or more specific embodiments of the present embodiments described herein will be described below. In an effort to provide a concise description of these embodiments, all features of an actual implementation may not be described in the specification.

As discussed above, human operators may use some type of interface with which to interact (e.g., monitor, control, analyze, examine) the machine or process of an industrial automation system. Increasingly, mobile devices and "thin clients" have been used in presenting visualization content representative of operation parameters of an industrial system for human operators. The migration to such devices removes some or all of the executable payload from the interface device, but allows for added flexibility, particularly where the interface device is small or mobile. However, even in such environments, the interface devices still simply reproduce views or screens that are predefined in firmware or software of the originating devices, such as automation controllers, HMI's, cameras, and so forth. That is, the interface device presents the views, graphics, screens, or visualizations without using computing resources related to generating the respective visualizations. Instead, these visualizations are streamed to the interface devices for presentation and the computing resource-intensive tasks related to generating the visualizations remain with the originating device.

With the foregoing in mind, a visualization management system may allow for useful data in the form of visualizations to be delivered to personnel utilizing, overseeing, controlling, maintaining, or otherwise interacting with the machines and processes. In particular, data comprising visualizations of the systems, parts of the systems, schematic views of the systems, actual images of the systems, data relating to the operation of the system (both in real or near-real time and historically) may be provided that include visualizations acquired from multiple different sources. That is, visualization content may be provided to multiple different users, such as via one or more fixed-location HMIs, by mobile or hand-held devices, or the like. These devices may be hard mounted on or near the controlled or monitored equipment or may be generally retained in a location (e.g., via a tether). In some embodiments, thin-client HMIs may receive the visualization content via any suitable wireless technology, or via wired connections (e.g., network cabling and protocols). Thin client devices may themselves be computer terminals, screens, monitors, tablet devices, smartphones, laptops, or any other device capable of receiving and displaying the visualization content.

As used herein the term "thin client" is intended to convey that the visualization-generating applications or executable code may not be executed by or instantiated on the thin client device itself (though the device may be capable of such functionality, computation, online operation, browser searching and display, telephonic or video calling, etc.). Instead, the thin client devices receive data defining an image or screen (i.e., visualizations) that is simply interpreted and displayed by the devices. In some embodiments, the thin client devices may receive a configuration for accessing a visualization (e.g., connection details for viewing the visualization or an output generated by a container of a container orchestration system). Advantageously, the devices may interact with the visualizations, such as by touching locations on a touchscreen of the devices, keyed inputs, voice commands, and so forth. In the automation context, such devices may be referred to as human machine interfaces ("HMIs"), or "thin client HMIs." As discussed below, the thin clients may perform useful tasks such as triggering visualization delivery based on certain events, authenticating and re-authenticating users, sharing of all or part of visualizations with others, and monitoring reduced-dataset visualizations where desirable, as defined by the configurations provided by a further component (that is, the visualization manager discussed below).

In some embodiments, the visualization management system may include visualization technology that enables users to view multiple views and screens combined in a single presentation or interface that can be created, viewed, interacted with, and altered in automated and manual ways. The visualization management system may be incorporated for the control and/or monitoring of any machine or process system, which itself may include multiple machines or processes. In many applications, these machines or processes may be controlled by dedicated control devices, such as one or more automation controllers. These one or more automation controllers may be located at, in or on the controlled and/or monitored system (e.g., mounted on the equipment or in close proximity to it, on a factory or facility floor, etc.), or in some cases may be at least partially remote from the equipment (e.g., in control rooms, etc.). In some embodiments, such monitoring and control components may be coupled to one or more machines (and other equipment) via networks.

Keeping this in mind, in some embodiments, the visualization management system may provide an interface to receive event-based triggers or conditions to cause the visualization management system to deploy visualization content to one or more thin client devices or displays. As such, users may define a triggering mechanism or condition, as well as destination display terminals in response to the visualization management system detecting the triggering mechanism. The user-defined events may correspond to events generated by external sources that the user defines or data received via certain channels (e.g., ActiveX, .NET). By receiving event definition for external application, the visualization management system may monitor for the defined event within the external application, through telemetry data provided by the external application or other suitable data sources.

In some embodiments, the visualization management system may provide pre-defined events that the user may choose or may provide an option to add an event or a class of events. In any case, after receiving the user-defined event data, the visualization system may deploy a related visualization to a particular display client or terminal upon detecting a related triggering event, thereby allowing some user to view the visualization content. The visualization content may be defined for the particular event to include visualization tiling, specific HMI content, execute certain applications, present video feeds, provide particular functionality for display, and the like.

By way of example, FIG. 1 illustrates an example automation system 10 employing visualization technology that enables users to view visualizations deployed in response to detected triggering events in accordance with embodiments herein. The system may be incorporated for the control and/or monitoring of any machine or process system 12, which itself may comprise multiple machines or processes 14 and 16. In many applications, these may be controlled by dedicated control devices, such as one or more automation controllers 18. These controllers may be located at, in or on the controlled and/or monitored system (e.g., mounted on the equipment or in close proximity to it, on a factory or facility floor, etc.), or in some cases may be at least partially remote from the equipment (e.g., in control rooms, etc.). In some embodiments, such monitoring and control components may be coupled to one or more machines (and other equipment) via networks 20.

As discussed in greater detail below, the system 10 allows for useful data in the form of visualizations to be delivered to personnel utilizing, overseeing, controlling, maintaining, or otherwise interacting with the machines and processes. In particular, data comprising visualizations of the systems, parts of the systems, schematic views of the systems, actual images of the systems, data relating to the operation of the system (both in real or near-real time and historically) may be provided that include visualizations acquired from multiple different sources. In the illustrated embodiment, visualization content 22 may be provided to multiple different users U, such as via one or more fixed-location HMIs 24A and 24B, by mobile or hand-held devices 26A and 26B, and other suitable display devices. These may be hard mounted on or near the controlled or monitored equipment or may be generally retained in a location (e.g., via a tether). It may be noted that the thin-client HMIs may receive the visualization content via any suitable wireless technology (as represented for devices 26A and 26B), or via wired connections (e.g., network cabling and protocols), as indicated for devices 24A and 24B. The devices may be referred to as "thin clients", and may themselves be computer terminals, screens, monitors, tablet devices, smartphones, laptops, or any other device capable of receiving and displaying the visualization content. As used herein the term "thin client" is intended to convey that the visualization-generating applications or executable code is not executed by or instantiated on the thin client device itself (though the device may be capable of such functionality, computation, online operation, browser searching and display, telephonic or video calling, etc.). Instead, the thin client devices receive data defining an image or screen (i.e., visualizations) that is simply interpreted and displayed by the devices. Advantageously, the devices may interact with the visualizations, such as by touching locations on a touchscreen of the devices, keyed inputs, voice commands, and so forth. In the automation context, such devices may be referred to as human machine interfaces ("HMIs"), or "thin client HMIs". As discussed below, the thin clients may perform useful tasks such as triggering visualization delivery based on certain user defined events, authenticating and re-authenticating users, sharing of all or part of visualizations with others, and monitoring reduced-dataset visualizations where desirable, as defined by the configurations provided by a further component (that is, the visualization manager discussed below).

In many applications, the machines or processes will be instrumented with a range of sensors 28 that detect operating parameters of the equipment (e.g., voltages, currents, speeds, flow rates, positions, levels, item counts, etc.). Similarly, multiple actuators 30 will typically be present, such as motors, valves, positioning devices, and so forth. For such devices (particularly motors), drives 32 or other control components may be provided that apply controlled power to the actuators to carry out various automation functions (e.g., manufacturing, processing, material handling, etc.). Although the drives 32 are illustrated as near the controlled actuators, in practice they may be situated in cabinets, racks, and so forth, and in some cases in the same enclosures or system locations as the automation controllers. Though not separately illustrated, the system 10 may also typically include various power and monitoring devices, such as switchgear, relays, contactors, disconnects, and so forth, as well as meters, gauges, read-out devices, and the like.

Also illustrated in FIG. 1 are cameras 34 that may be positioned to capture still or moving images of all or a part of the equipment making up each machine or process, products made or handled by them, personnel interacting with them, and so forth. The captured images are reduced to transmissible data by each camera and the image data may be transmitted to any desired device, such as for inclusion in a visualization as discussed below.

It should be noted that the arrows to and from the sensors, actuators/drives, and cameras are intended to indicate that data is exchanged with these components. The data may include control signals, feedback signals, monitored data, instructions, or any other useful data that may serve an automation (e.g., control and/or monitoring) function. In some embodiments and for some components, the data is exchanged with automation controllers 18 or other control and/or monitoring equipment, while other data may be provided directly to servers and other devices that receive visualization content and compile the visualizations discussed below. In certain presently contemplated embodiments, the visualizations are accessed by the thin clients based upon pre-determined configurations and policies, and visualizations are generated, delivered to and displayed by the thin clients based upon these configurations.

In embodiments made up of multiple processes 14, 16, these may be positioned in or logically associated in zones 36A and 36B that may at least partially overlap as illustrated. Each zone, or portions of zones may be served by one or more components that allow for detecting the presence of a user U and/or a thin client HMI 26A, 26B, as indicated by reference numerals 38A and 38B. Such devices may be referred to as "resolvers" and serve to provide signals that can be detected by the thin client HMIs, or by other devices, or that provide indicia (e.g., bar codes) that can be detected or scanned to produce signals indicative of location. In general, the function of the resolvers is to either directly or indirectly provide indications of the presence of the user U or the thin client HMI in a zone or zones of the system. As discussed below, the visualization content, and particularly the combined visualizations created may be adapted according to such factors as the user, the user's role, the location, the thin client HMI device, time, machine conditions, event triggers, and so forth.

In the illustration of FIG. 1, some of the components of the automation system may be in data communication via one or more networks, as illustrated for the automation controllers 18 and HMIs 24A and 24B. Many other automation components may be networked in this manner, including components on or near the controlled or monitored machines or processes, and components and systems located on-site or remote from the machines or processes, as indicated by block R. Whether connected by wired or wireless network links, any of these components that generates visualizations may be accessed to provide the visualizations to the thin client HMIs (and/or to other HMIs and components).

In the illustrated embodiment, an example device for enabling access to the visualizations takes the form of a "visualization manager 40" or server. The visualization manager 40 may itself comprise one or more servers or other processing components capable of accessing or permitting access to data defining visualization content from multiple other components that themselves produce the content. The visualization manager 40 may be coupled to or include interface circuitry 42 for transmitting data between the manager and HMIs (e.g., for authentication) and for permitting access to visualizations on the thin client HMIs, such as based on policies defined by one or more operators and stored on the manager. As discussed below, in operation, the visualization manager 40 may receive data indicative of such factors as identifications of the thin client HMIs, their location, their users or the user roles, event triggers, and so forth, and based upon permission policies incorporating such information, permits access by the thin client HMIs directly to visualizations generated by one or more other components, which may be referred to as industrial automation visualization sources. Here again, and as also discussed below, these policies allow for highly customized provision of visualizations from visualization sources and for creation of derivative visualizations, such as partial visualizations, "faceplate" or reduced or limited dataset visualizations, and so forth, which may be based on factors such as the particular user, the user's particular role, the particular location where the visualizations may be viewed and/or interacted with, the particular thin client HMI device, the particular time, particular machine conditions, and so forth. It may be noted that one or more of the visualizations making up the delivered and displayed visualization content may also be adapted based upon such factors, though other visualizations may be unchanged or otherwise specified. Also, as discussed below, the visualizations accessed and displayed on one or more of the thin client HMIs may allow the user or operator to alter or otherwise interact with one or more of the visualizations, such as to carry out control functions in conjunction with an originating source, such as an automation controller, motor controller or drive, etc.

The policies may be developed and configured, along with definition and configurations of the visualizations via a configuration terminal/system 46. Software, firmware or a combination may be executed on the configuration terminal to select the particular visualizations desired, the users, the user roles, the locations, the devices, and any other relevant factors or data that will form the basis for acquiring the desired visualizations from source devices, compiling or defining any derivative visualizations (e.g., nameplate visualizations based on templates), and displaying the visualizations on the devices in accordance with the relevant factors. The collection of rules established in this way are the "policies" implemented by the visualization manager 40.

In operation, the visualization manager 40 itself may not typically execute or instantiate applications that produce the visualization content that is accessed and displayed, but based on the policies, refers to configuration data 48 to permit the thin clients to access such content from other devices where the applications are running. In some cases, the visualization manager 40 may compile visualizations from data from the data sources and deliver them to the thin client HMIs. The sources may include, for example, automation controllers, and other computers controlling and/or monitoring the machines or processes, computers on which models, schematics, documentation, historical data, or any other useful visualization content are stored or created. The configurations for regulating access by the thin clients by the visualization manager 40 may also cause the thin clients to access camera inputs in the form of streaming image data that can be incorporated into one or more visualizations. The ability to store and provide configurations for receiving and accessing these visualizations allows the visualization manager to play a role that is provided by none of the contributing visualization data sources, and in a manner that reduces or eliminates the need for a programmer or user to separately access or separately display the individual visualizations (e.g., reducing the need to page or flip through different screens providing different information).

As shown in FIG. 1, the visualization manager 40 may communicatively couple to a variety of devices 44 that may include graphic terminal units (e.g., PanelView), web content, enterprise resource planning (ERP) servers, manufacturing execution system (MES) servers, other human machine interfaces (HMIs), and the like. In some embodiments, the devices 44 may also include a tag server that may store information related to various tags or objects associated with events that may be detected by the visualization manager 40 as described herein. The tag server may store associations between tags and applications or devices (e.g., machine 14, 16) that executing control code or software related to a respective alert or event. As such, the visualization manager 40 track or identify applications or devices that invoke an event-based trigger.

As used herein, the thin client HMIs merely receive and display the visualizations, and may permit interactions, such as to access other sites or remote information, command certain permitted functions to be performed by the source where the applications are running, and so forth. In the industrial automation context these may include some or all permitted control operations that can be done by the source, such as in the case of an automation controller or motor drive.

Figure 2:
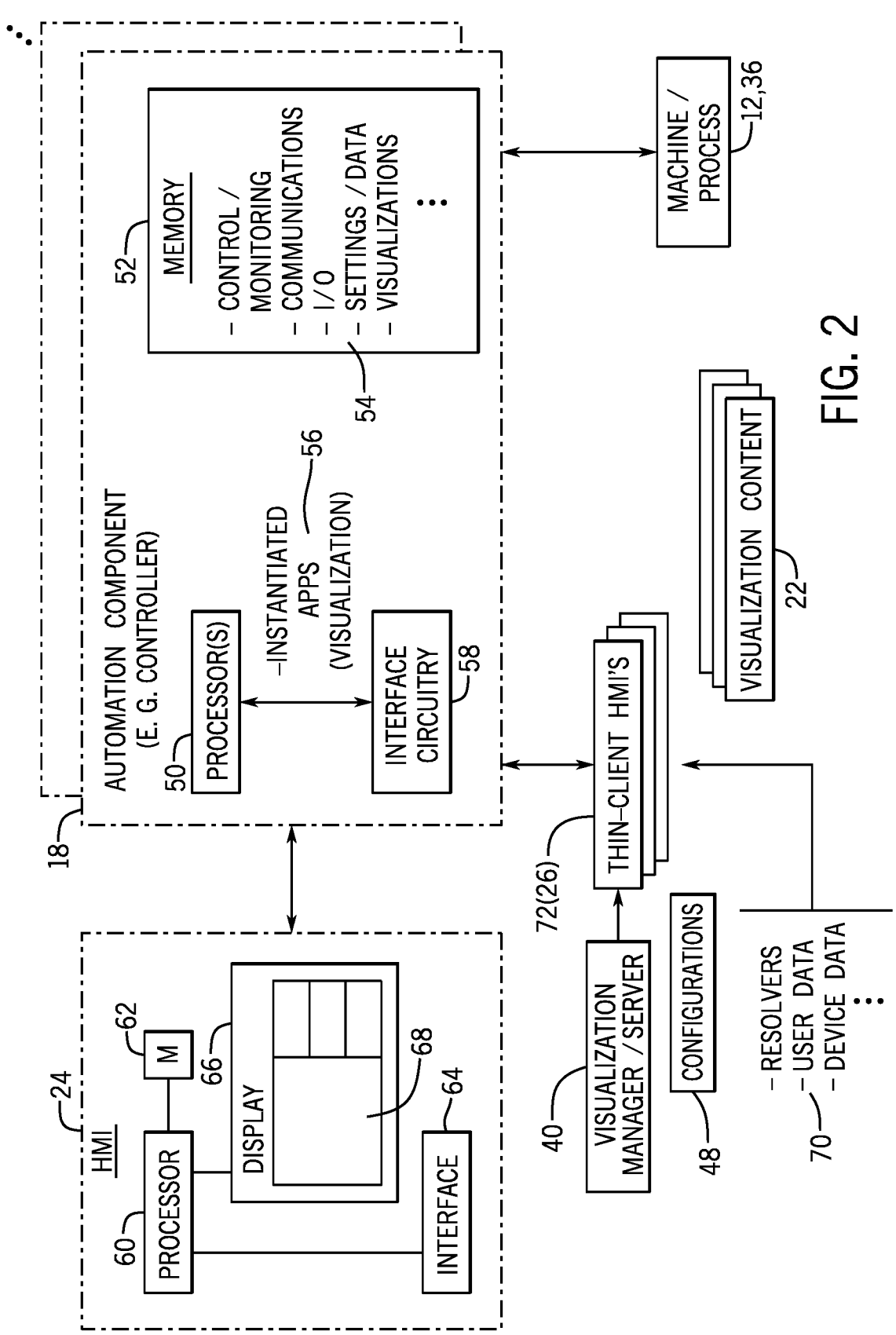
FIG. 2 is a diagrammatical representation of certain of the functional components of an example visualization system including a server or visualization manager for providing visualizations to one or more thin client HMIs, in accordance with embodiments described herein.

FIG. 2 illustrates certain components of the system of FIG. 1 in somewhat greater detail. In the illustrated embodiment, one or more automation controllers 18, such as an automation controller, provides visualization content (e.g., whole or partial pages or screens, components of visualizations, such as virtual instruments, virtual push buttons, schematics or virtual representations of the machine or system, or a portion of it, etc.). The content may be provided by a processor 50 acting on instructions stored in one or more memory circuits 52, which may be on-board or off-board of the automation component. In general, for automation applications, as indicated generally by reference 54, the memory may store control and monitoring instructions (e.g., code that, when instantiated or executed performs pre-determined monitoring and/or control functions), communication instructions (e.g., for exchanging data in accordance with standard communications protocols), input/output data (e.g., for addressing, accessing, and storing data from sensors, and commands for actuators), various system and component settings and related data, and the visualization definitions for creating the desired visualizations based upon available data. The processor (or multiple processors, or multiple cores of a multi-core processor) may then instantiate or execute one or more applications for generating the desired visualization. In the present embodiment, as least these applications are run on the automation component, which then comprises a visualization content source for the thin client HMIs. The component will also include interface circuitry that allows for exchange of data (including the visualization content) with external devices, such as the thin client HMIs.

As noted above, the visualization manager 40 retains configurations that permit the thin client HMIs to access visualizations or that define derivative visualizations based upon data available from the content sources, and to display this content in accordance with the policies stored on the visualization manager. One such device may be an adapted HMI 24. The HMI may be the same as or similar to prior art HMIs, but in the case of the derived visualizations (e.g., reduced, limited, nameplate) contemplated by the present disclosure, these will only receive and display the visualizations without creating them internally. That is, insomuch as the accessed and derived visualizations are concerned, the HMIs 24 may act here as thin clients. They may comprise one or more processors 60 for processing (e.g., combining) the received visualizations, as well as memory circuitry 62 storing instructions and configuration data for such operations. One or more interface circuits 64 allow for data communication with other devices (e.g., the automation component where desired, and the visualization manager 40). A display 66, typically in the form of a screen display allows for provision of screens or pages, or portions of these to the user, including the visualization 68. It should be noted that in the overall system, any HMIs may also be of a conventional type that are in direct communication with a component (e.g., an automation controller) for receiving and displaying content, and for acting on the content in conventional manners. In such cases, the system offers backcompatibility by allowing the use of conventional HMIs, as well as thin client HMIs. Also, illustrated in FIG. 2 are a series of data sources (e.g., resolvers, user data, device data) from which the thin client HMIs, based upon the configurations from the visualization manager 40, may access the visualizations, and display the visualizations in accordance with the established policies. These may include, for example, cameras, resolvers, user data (e.g., input automatically, semi-automatically, or manually by human operators), device data (e.g., preconfigured or provided by manual input or automated detection).

Figure 3:
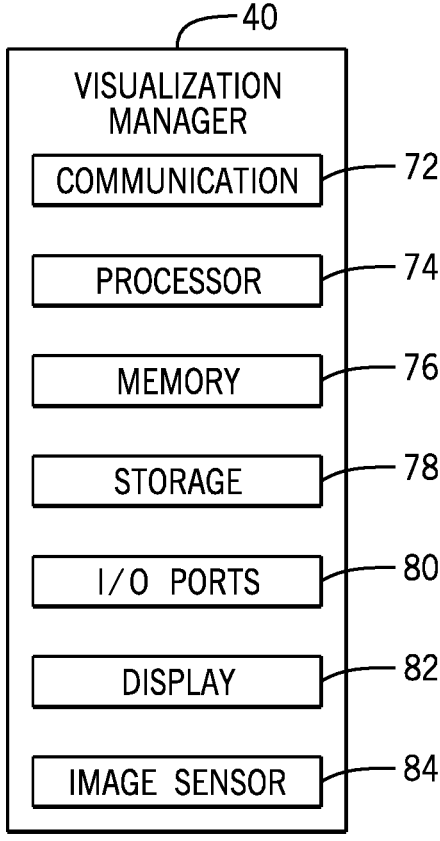
FIG. 3 is a block diagram of an embodiment of the visualization management system shown in FIG. 1, in accordance with embodiments described herein.

FIG. 3 illustrates certain example components of the visualization manager 40 described herein. The visualization manager 40 may include a communication component 72, a processor 74, a memory 76, a storage component 78, input/output (I/O) ports 80, a display 82, an image sensor 84, and the like. The communication component 62 may be a wireless or wired communication component that facilitates communication with the thin clients 26 or any other suitable electronic device. The processor 84 may be any type of computer processor or microprocessor capable of executing computer-executable code. The processor 84 may also include multiple processors that may perform the operations described below.

The memory 86 and the storage 88 may be any suitable article of manufacture that may serve as media to store processor-executable code, data, or the like. These articles of manufacture may represent computer-readable media (i.e., any suitable form of memory or storage) that may store the processor-executable code used by the processor 84 to perform the presently disclosed techniques. The memory 86 and the storage 88 may represent non-transitory computer-readable media (e.g., any suitable form of memory or storage) that may store the processor-executable code used by the processor 84 to perform various techniques described herein. It should be noted that non-transitory merely indicates that the media is tangible and not a signal. The I/O ports 80 may couple to one or more sensors, machines 12, processes 36, one or more displays, or the like to facilitate human or machine interaction with the visualization manager 40.

The display 82, as discussed above, may operate to depict visualizations associated with software or executable code being processed by the processor 74. In one embodiment, the display 82 may be a touch display capable of receiving inputs from a user of the visualization manager 40. The display 82 may be any suitable type of display, such as a liquid crystal display (LCD), plasma display, or an organic light emitting diode (OLED) display, for example. Additionally, in one embodiment, the display 82 may be provided in conjunction with a touch-sensitive mechanism (e.g., a touch screen) that may function as part of a control interface for the visualization manager 40.

In some embodiments, HMIs 24 may execute configuration applications that may include many different screens and interfaces that establish the policies for defining the visualizations to present from various content sources (e.g., automation controllers, cameras, etc.). As noted above, the policies may be established based upon identification and definition of the thin client devices, the users, the locations, data and content sources, event triggers, the individual visualizations to be reduced or derived from available data. The configuration applications may be defined by a user at a terminal of the respective HMI 24 and may involve user programming for establishing the policies, as well as for communicating the policies and any associated data to the visualization manager 40. As such, the visualization manager 40 receives the policies and configurations of visualizations from the HMI and acts on them to allow the thin client HMIs 24, 26 to access, display, and interact with the visualizations.

User-Defined Event-Based Then Client Content Deliver

With the foregoing in mind, the visualization manager 40 may receive information from a user to define an event-based trigger for delivering visualization content. That is, in some embodiments, the user may interact with a user interface (UI) via the visualization manager 40 or other suitable device to define triggering mechanisms (e.g., conditions, alerts, events) for the delivery of particular types of visualization content. By way of example, the events may correspond to any suitable detectable conditions including those populated or detected by sources external to the visualization manager 40. For instance, the user may define a parameter with the visualization manager 40 to monitor a communication channel (e.g., ActiveX, .NET, WebSocket) for a particular condition/event or collection of conditions/events that may be generated by external applications. Upon detecting a triggering event, the visualization manager 40 may generate and transmit visualization content to one or more displays as defined by the user-defined event. The deployed visualization content may include tiles of visualization, HMI content, adding visualizations that call other applications, video feeds, providing functionality for display, and the like.

In this way, the visualization manager 40 may allow the user to define an event for any external application, such that the event may be defined without employing programming syntax or codes to modify the respective external applications. By defining events without directly modifying the code or programming of the respective external application, the present embodiments may better enable users to update visualization deployment processes in an efficient manner.

Keeping this in mind, FIG. 4 is a flow chart of a method for deploying visualization content based on user-defined events detected by the visualization management system, in accordance with embodiments described herein. Although the following description of the method 90 is described in a particular order and being performed by the visualization manager 40, it should be understood that the method 90 may be performed in any suitable order and by any suitable device.

Referring now to FIG. 4, at block 92, the visualization manager 40 may receive a request to define an event-based trigger for deploying visualization content. In some embodiments, the visualization manager 40 may present a user interface or input fields via the display 72 that may allow the user to select or input an option to provide the request.

After receiving the request, the visualization manager 40 may present a visualization the includes options with regard to selecting pre-defined event-based triggers, adding new event-based triggers, or the like. The pre-defined event-based triggers may include event conditions (e.g., detected event and corresponding display content deployment) that may have been pre-populated by user or identified using machine learning methodologies. In any case, the pre-defined event-based triggers may detail one or more conditions that the visualization manager 40 may track or monitor, visualization content to be displayed in response to detecting the conditions, one or more destination displays for presenting the visualization content, one or more formats in which to present the visualization content, and the like.

Figure 5:
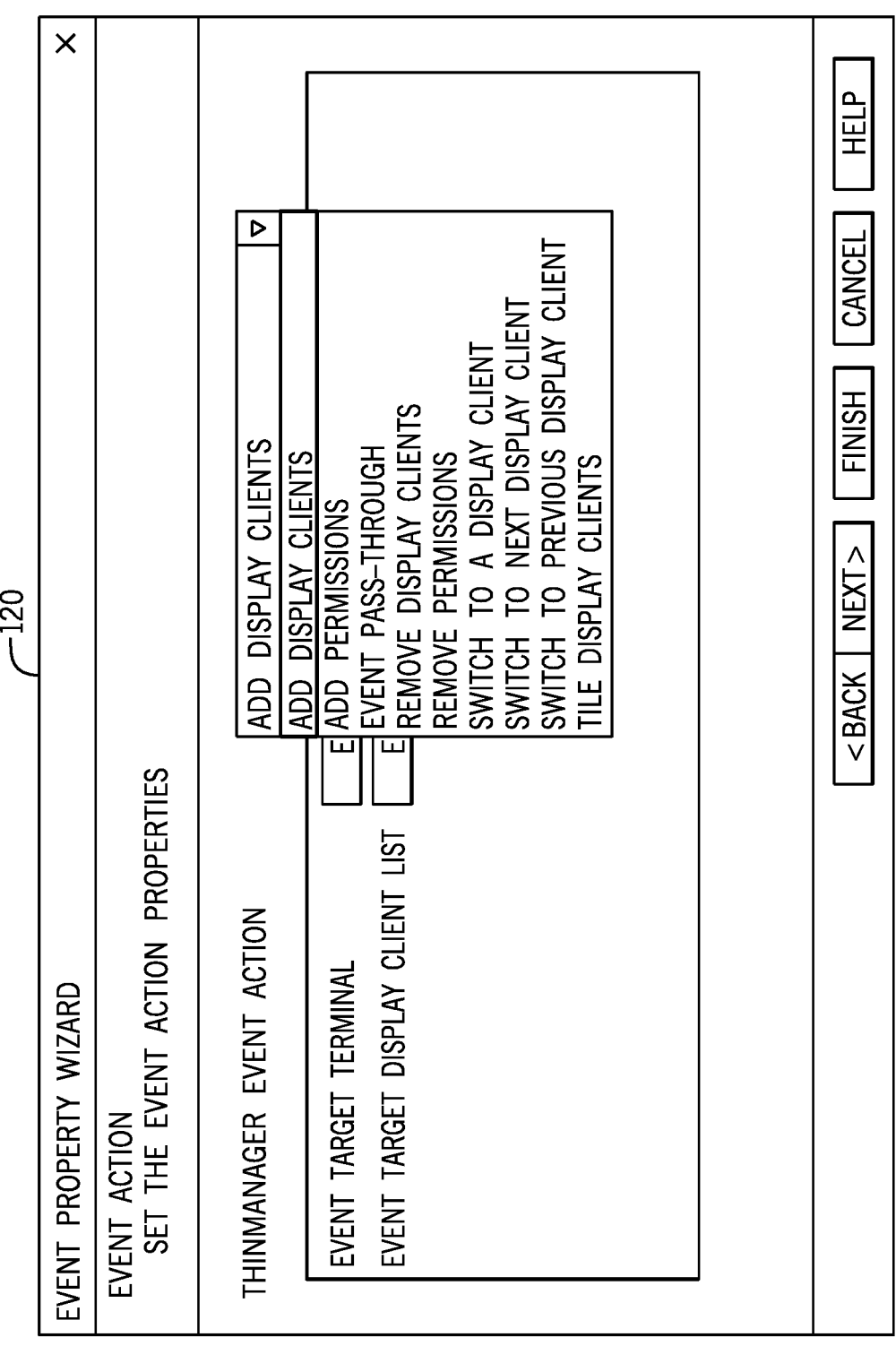
FIG. 5 is an example graphical user visualization for setting event action properties, in accordance with embodiments described herein.

If the user does not select a pre-defined event-based trigger, the user may provide an input to the visualization manager 40 requesting to add a new event-based trigger. At block 96, the visualization manager 40 detect whether the user selected the option to add a new event-based trigger. If the new event-based trigger is selected, the visualization manager 40 may proceed to block 98 and receive event-based trigger information for the new event-based trigger. By way of example, FIG. 5 illustrates an example graphical user visualization 120 for setting or defining event action properties, in accordance with embodiments described herein. As shown in FIG. 5, the visualization manager 40 may present a graphical interface that allows the user to perform some action in response to detecting an event. As shown the user may add display clients, add permissions, define event pass-throughs, remove display clients, remove permissions, switch to a display client, switch to a next display client, switch to a previous display client, and tile the display clients. That is, the user may define an event, which may include manners or formats (e.g., tiled view) in which the visualization content is presented, and conditions in which the selected event may be triggered.

Figure 6:
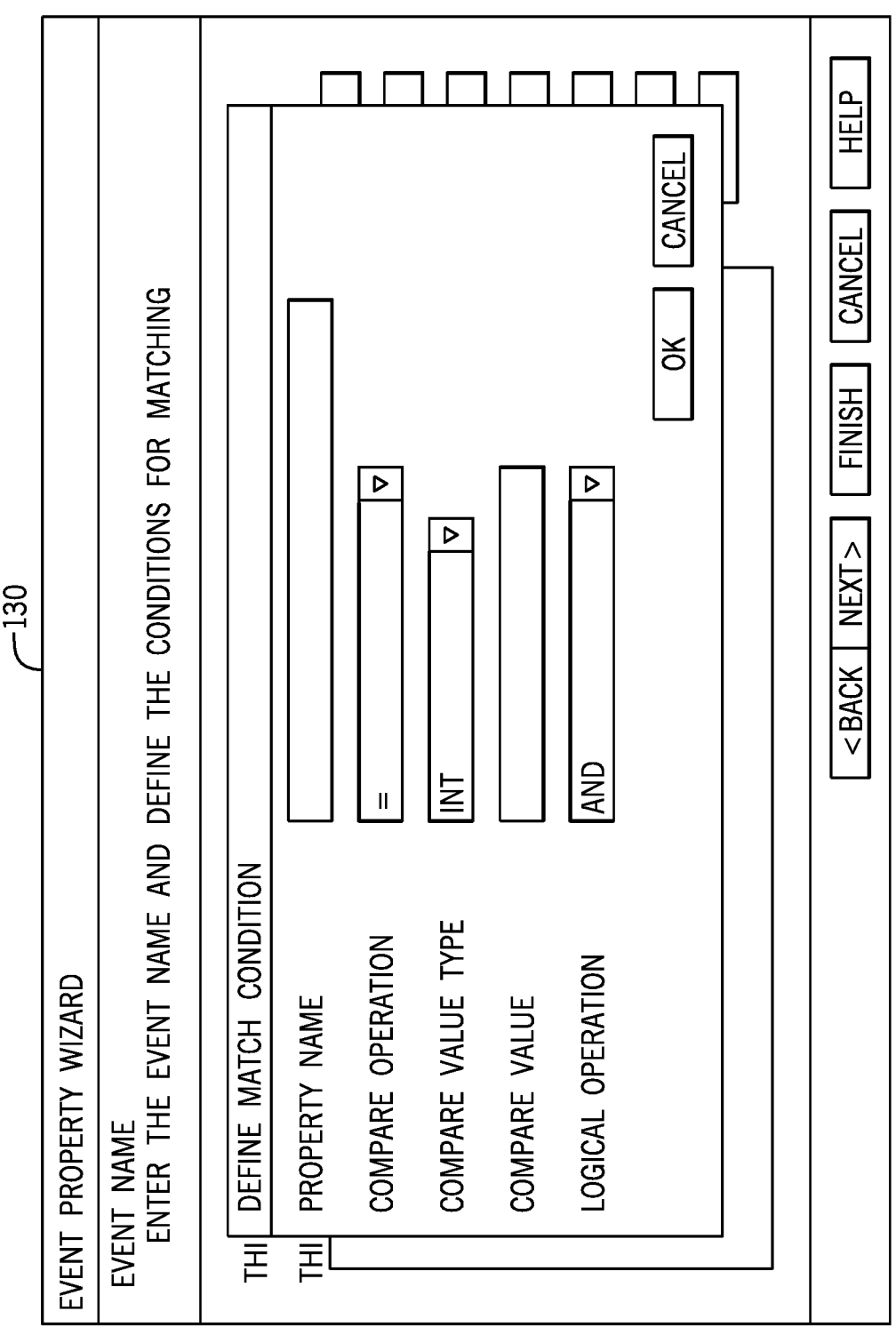
FIG. 6 is an example graphical user visualization for defining match conditions of a user-defined event, in accordance with embodiments described herein.

After selecting a particular event action, the visualization manager 40 may proceed to block 100 and receive match conditions for the event-based trigger. That is, the user may provide parameters or inputs that define the event-based trigger information. By way of example, FIG. 6 illustrates an example graphical user visualization 130 for defining match conditions of a user-defined event, in accordance with embodiments described herein. As shown in FIG. 6, the match condition may define an instance or scenario in which the selected event is triggered. As such, the user may provide inputs to define a property name, a compare operation (e.g., equal to, greater than, less than), a value type (e.g., integer), a compare value (e.g., threshold), a logical operator (e.g., Boolean operator), and the like. As such, the user may define a condition in which the event action will be performed by the visualization manager 40.

In some embodiments, the user may define communication terminals or components that may be monitored for the match conditions. By way of example, the user may define an ActiveX, .NET, WebSocket, or other suitable channel that may be accessible to the visual manager 40. As such, other devices that may be communicatively coupled to the visualization manager 40 may output data values and information that may be monitored by the visualization manager 40, which may detect the match conditions.

In some embodiments, the automation controller 18, the machines 12, or other equipment may execute a software package that may output or publish data on a communication channel accessible to the visualization manager 40. In addition, the software package may allow the visualization manager 40 to provide visualization content 22 to the respective device for display.

At block 102, the visualization manager 40 may receive visualization content that the user intends to be deployed in response to the conditions defined in block 100 being detected. The visualization content may include various types of visualizations such as providing image data or a camera display of images or video acquired from one or more image sensors, an alarm visualization that present data fields that include values that exceed certain alarm thresholds, a number of visualizations related to the match conditions presented in a tile arrangement, a signature or authentication visualization request, and the like.

In some cases, the visualization content 22 may include constructive or destructive actions. The constructive event may include adding visualization content 22, while the destructive event may remove the visualization content 22. In any case, the user may define the type of visualization content 22 to display or remove via a user interface and software presented to the user via the visualization manager 40.

Figure 7:
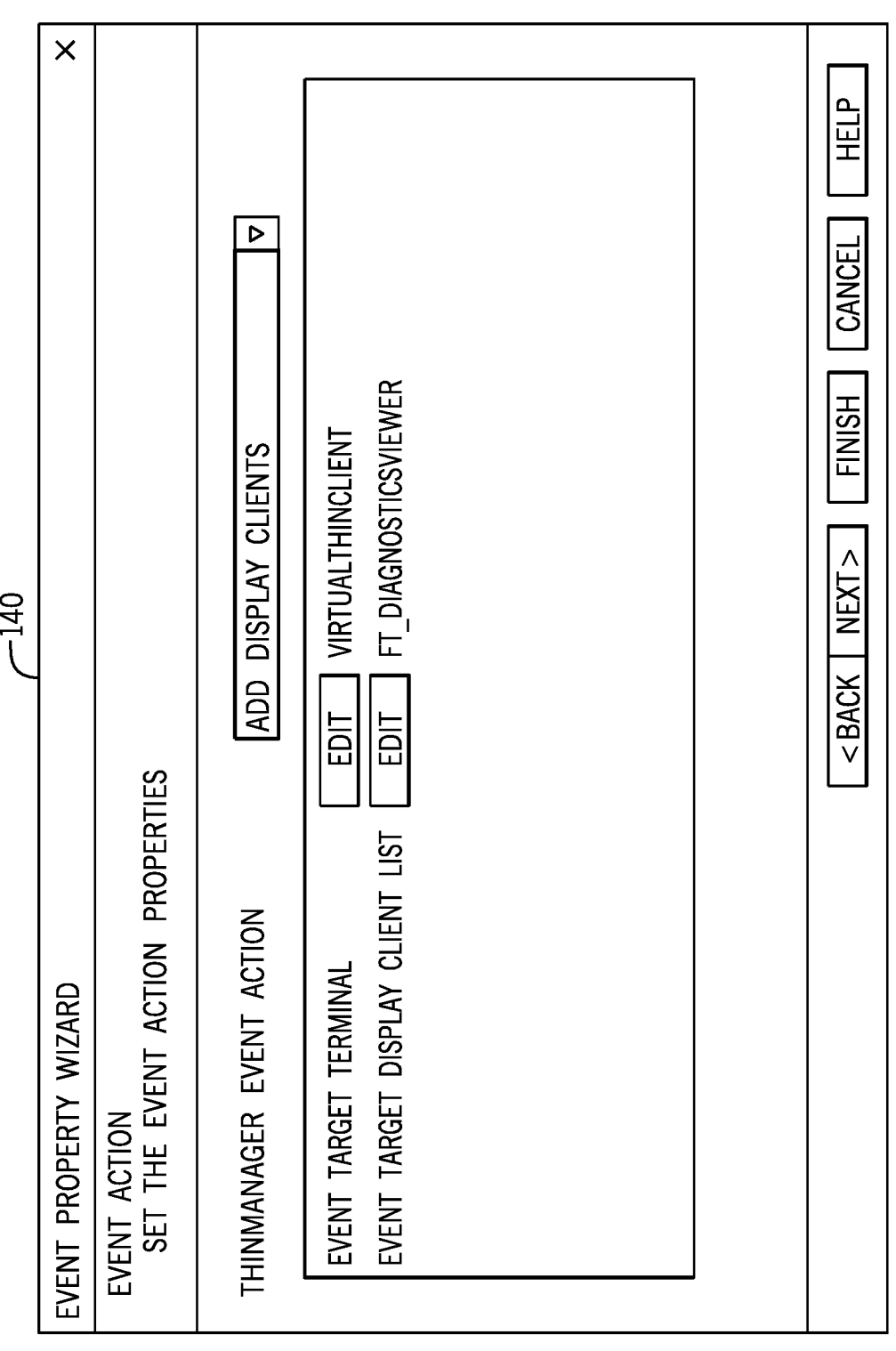
FIG. 7 is an example graphical user visualization of target deployment properties for the deployed visualization content, in accordance with embodiments described herein.

Referring again to block 102, the user may provide or specify an event target terminal that may designate a target device (e.g., thin-client HMI 26) that may present the visualization content 22 in response to the match conditions being detected. The target terminal may be defined as a particular device located within a proximity or distance relative to the device that provided data to trigger the match conditions, devices that are associated with personnel responsible for maintaining the device that provided the trigger data, and the like. By way of example, FIG. 7 illustrates an example graphical user visualization 140 of target deployment properties for the visualization content 22, in accordance with embodiments described herein. As shown in the example, the event target terminal is defined as a virtual thin client (e.g., thin-client HMI 26).

Figure 8:
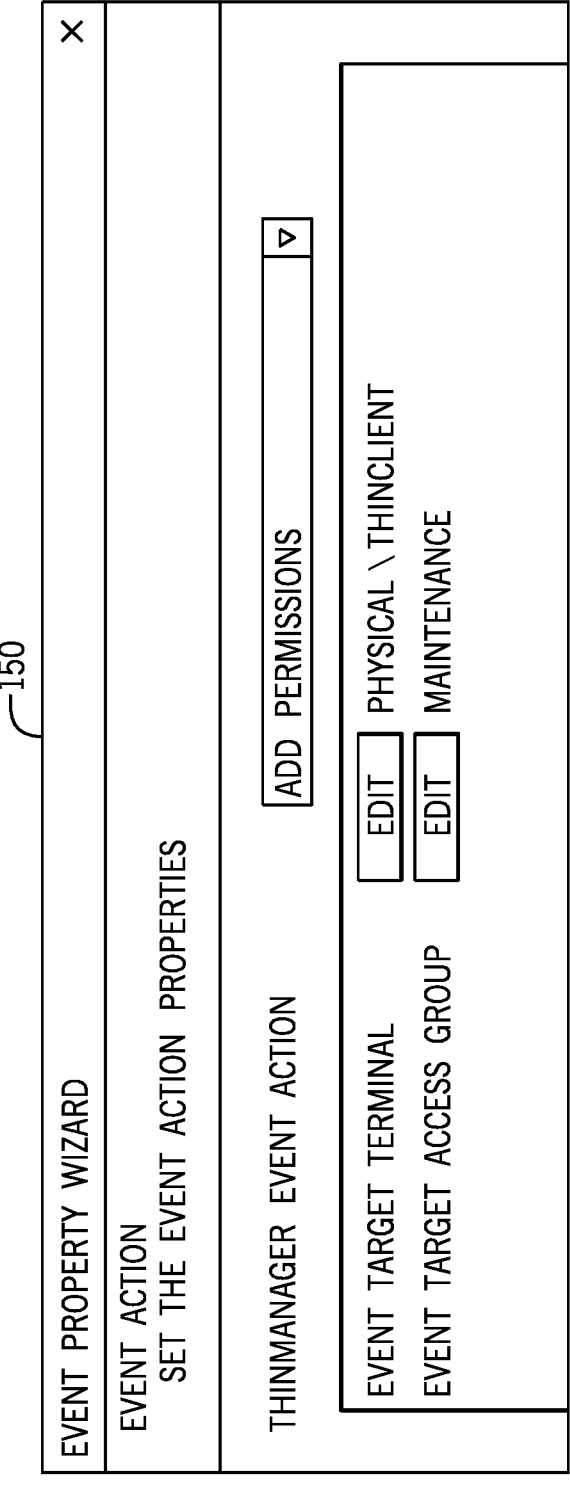
FIG. 8 is an example graphical user visualization of target access groups for the deployed visualization content, in accordance with embodiments described herein.

With this in mind, in addition to providing visualization content 22, the user may also define or add permissions to allow a particular group of individuals access to view the visualization content 22. That is, the user may provide an indication related to a class or type of employees (e.g., management, tier number, maintenance, administrator) and the visualization content 22 may be provided to the devices that are associated with the individuals that correspond to the appropriate permission class. For instance, FIG. 8 illustrates a selection of "Maintenance" being designated as the event target access group in the example graphical user visualization 150. As such, the visualization content 22 designated to be deployed to a target device may be provided to the device if the device is designated as part of the maintenance group. In some embodiments, user credentials (e.g., identification, password, biometric authentication) may be used to access the device terminal and the visualization manager 40 may deploy the visualization content 22 in response to determining that the appropriate access group with the specified permissions are currently accessing (e.g., logged into) the respective devices. As such, the visualization manager 40 may query the login or user status of the connected devices to determine the users that are currently accessing the respective devices when determining the devices to send the visualization content 22.

Figure 9:
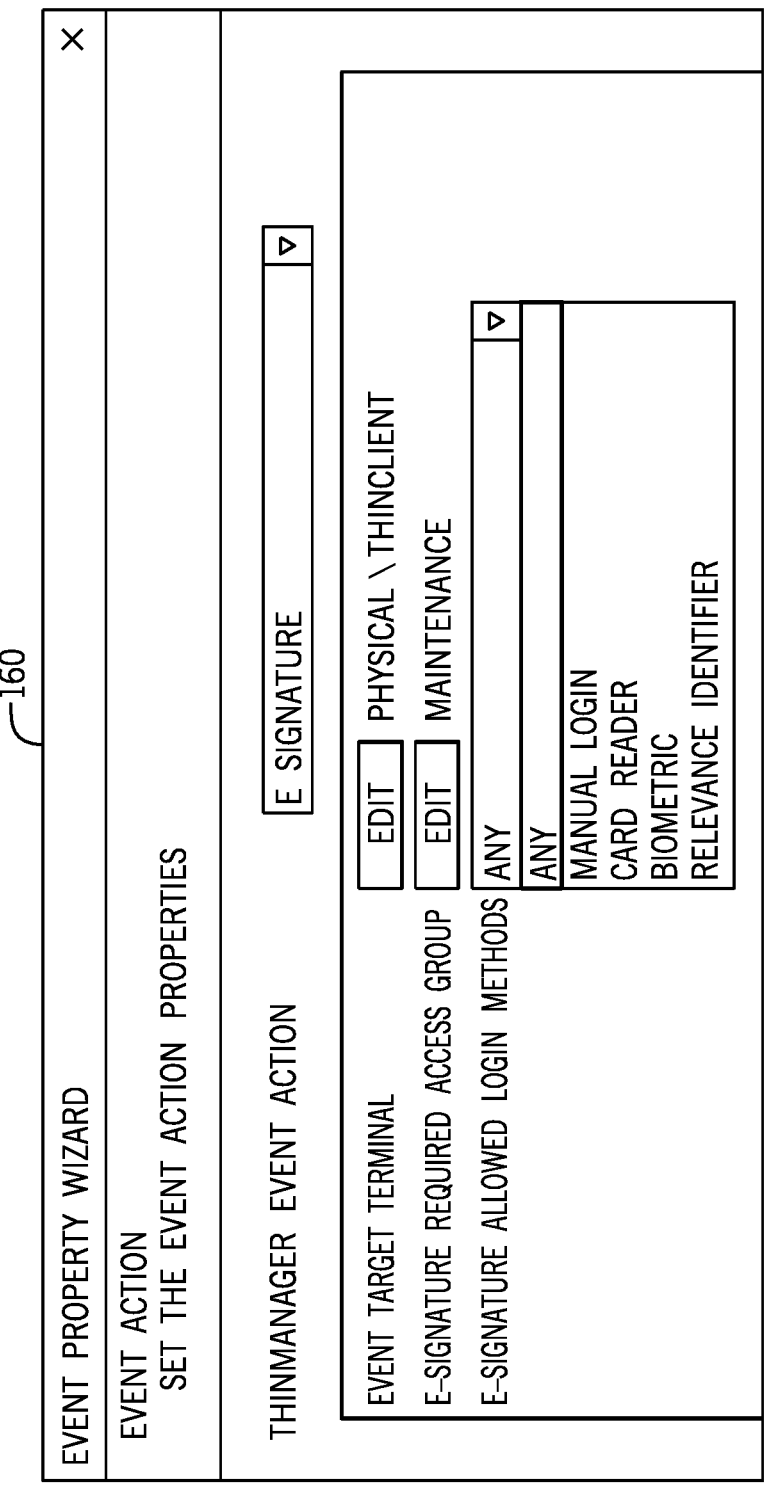
FIG. 9 is an example graphical user visualization of electronic signature settings for the deployed visualization content, in accordance with embodiments described herein.

In some embodiments, an electronic signature (e.g., e-signature) action may also be selected by the user to trigger an electronic signature action from a terminal or device in which the visualization content 22 is targeted for deployment. By way of example, FIG. 9 illustrates an example graphical user visualization 160 for sending visualization content 22 that requests electronic signature in response to the detected match conditions. That is, the electronic signature requests may be sent to devices as specified in the match condition in response to a condition being detected by the visualization manager 40.

With this in mind, the user may define an event target terminal to specify a device or device type (e.g., user group) to send the electronic signature request prior to providing the respective visualization content 22. In addition, the user may define an access group that is allowed to view the visualization content 22 after validating the electronic signature request via the respective device. The user may also define allowed authentication methods, as shown in the example graphical user visualization 150. By way of example, the user may define that authentication can be completed by manual login (e.g., username/password, security code), card reader (e.g., providing physical card input), biometric (e.g., fingerprint, facial scan, voice authentication), relevance identifier, and the like. In some embodiments, the user may select multiple authentication mediums.

By way of operation, after detecting the match conditions, the visualization manager 40 may identify the devices to deploy the visualization content 22 and determine whether electronic signature authorization is requested prior to presenting the visualization content 22. If the authorization is specified, the visualization manager 40 may send the request for the appropriate authentication, receive the authentication verification, and send the visualization content 22 in response to receiving the authentication verification.

Referring again to FIG. 5, the user may also specify a pass-through event, remove display client events, remove permission events, switch display client events, switch to next display client events, switch to previous display client events, tile display client events, and the like. The pass-through event may include monitoring for an event from external channels, detecting the match conditions being present, and then passing a result (e.g., indication of the match condition, data related to the match condition) to one or more other applications (e.g., external applications) on a communication channel (e.g., VB, ActiveX, etc.). In this way, the visualization manager 40 may operate as a publisher/subscriber engine that publishes events for applications that may analyze data related to the detected events. The external application tasked with analyzing the relevant data could be the same or different as the application receiving or detecting the event. However, in some embodiments, the respective application may not be tied to displaying visualization content 22. For instance, a trigger event may be detected in a PLC controller, communicated via a communication channel, where the visualization manager may detect a match condition. In turn, the visualization manager 40 may identify a data analytics software application specified by the user input to provide the collected data or command to collect data from some source, such that the data analytics software application may analyze the collected data. It should be understood that the data analytics software application may be executed on the same device as the visualization manger 40 or on a separate device. In any case, the application executed based on the pass-through event may be executed with or without deploying instructions to present visualization content 22.

The remove display client event may remove the visualization content 22 or a portion of the visualization content 22 in response to detecting the match condition. In the same manner, the remove permission event may remove an access group from being able to view the visualization content 22 in response to the match condition being detected.

The switch to display client event may specify a particular display client on the respective device in which the visualization content 22 is deployed. The display client may include a software tool, visualization application, or some other client application that may be stored and executable via the respective device. By way of example, the display client may include an application such as FactoryTalk Diagnostics Viewer, which may present local logs of published diagnostic messages related to the operations of an industrial device (e.g., machine 12, process 36).

With this in mind, a number of display clients may be executed or open simultaneously on the respective device (e.g., thin-client HMI 26, automation controller 18, HMI 24). The display clients may be associated with a particular order, and the switch to next display client event may cause the device to switch to a subsequently ordered display client in response to the match condition being detected. In the same manner, the switch to previous display client may cause the device to switch to a precedingly ordered display client in response to the match condition being detected.

Moreover, the tile display client event may cause the respective device to tile the display clients in a tiled fashion. In some embodiments, one of the display clients may be specified by the user to be presented as the first display client. In any of the events described above, the visualization content 22 may be presented along with the other display clients, via one or more of the display clients, or the like.

Returning to the method 90 of FIG. 4, after receiving the visualization content and trigger information at block 102, the visualization manager 40 may proceed to block 104 and monitor for the match conditions defined at block 100. As mentioned above, the visualization manager 40 may monitor certain communication channels such as ActiveX, .NET, WebSocket, and other channels that may publish or transmit data related to the match conditions. In some embodiments, the visualization manager 40 may receive directed communications from various devices to store data related to the operations or operational statuses of each device. The visualization manager 40 may, in turn, analyze the received data to determine whether the match condition is present.

After determining that the match condition is present, the visualization manager 40 may proceed to block 106 and identify a remote source (e.g., remote to thin-client device 26) having the appropriate visualization content 22 defined in event-based trigger information (e.g., blocks 98-102). As such, the computing resources of the visualization manager 40 and the thin-client device 26 may avoid generating the visualization content 22. However, in some embodiments, the visualization manager 40 may generate the visualization content 22 and send the generated visualization content 22 to the thin-client device 26. In addition, in some embodiments, the visualization manager 40 may offload the processing and generation of the visualization content 22 onto a cloud computing system, server systems, containers, and the like. As a result, the visualization content 22 being presented by the target device may not expend computing resources on generating the visualization content 22.

Figure 10:
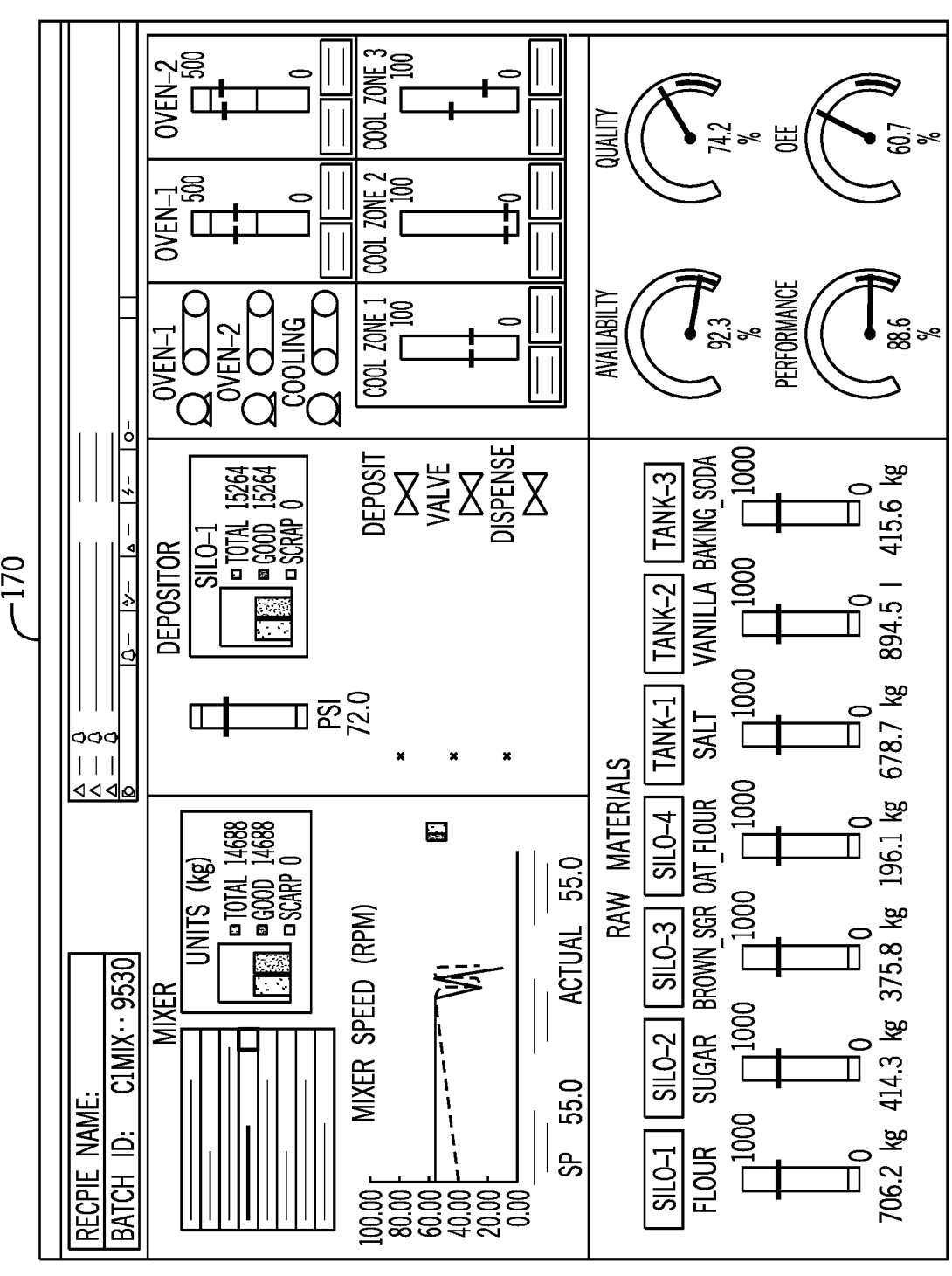
FIG. 10 is an example visualization of a parameter values related to an industrial system, in accordance with embodiments described herein.
Figure 11:
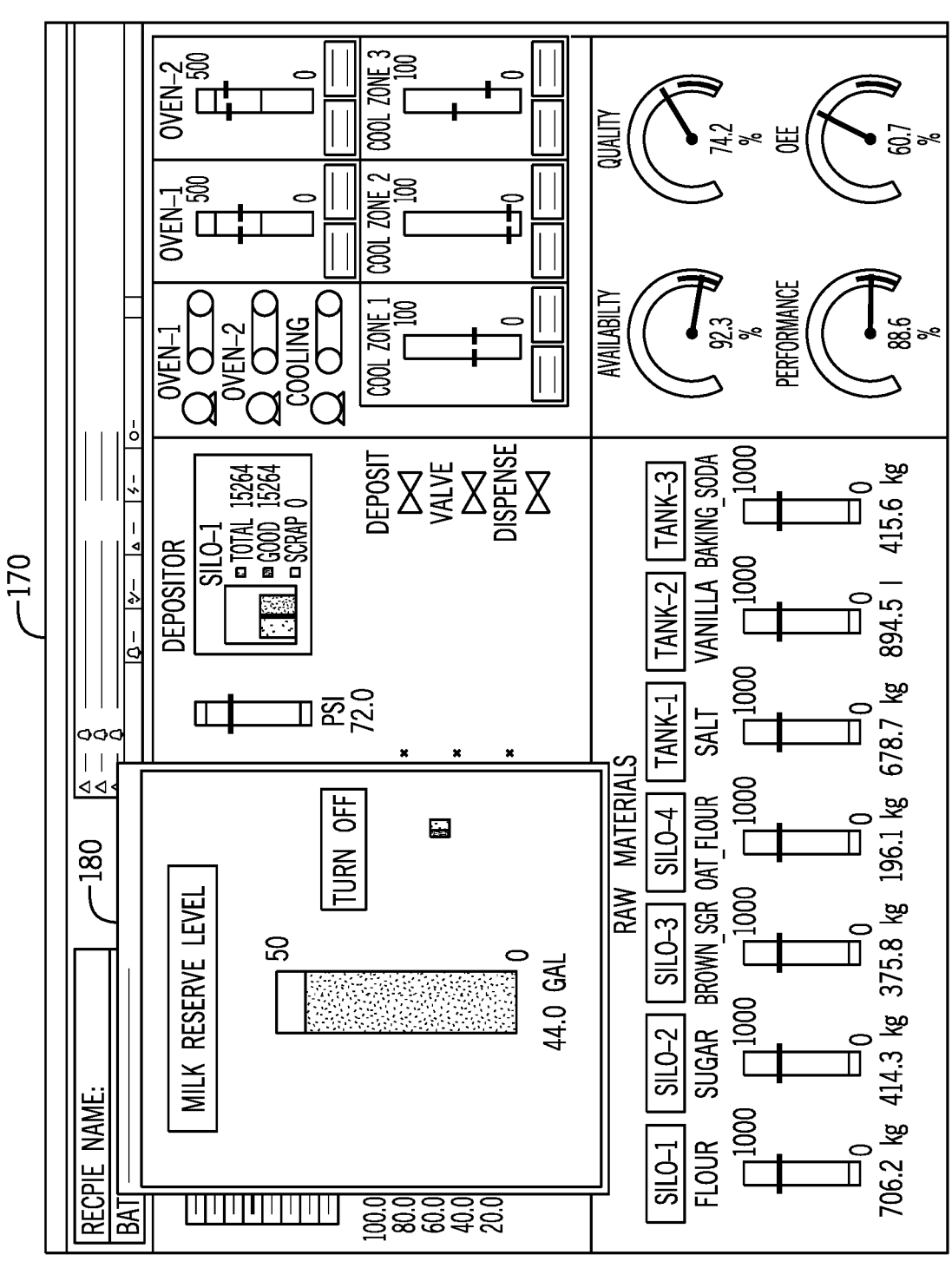
FIG. 11 is an example visualization of a user-defined visualization event generated in response to a detected event, in accordance with embodiments described herein.

After identifying the remote source having the visualization content 22, the visualization manager 40 may transmit instructions to the respective thin-client device 26 at block 108. By way of example, the visualization manager 40 may send instructions that cause the respective thin-client device 26 to access the visualization content 22, such as measurement visualization 170, as depicted in FIG. 10, via the remote source. However, the measurement visualization 170 may not be presented by the respective thin-client device 26 because a match condition has not been detected. In one example, after a measurement value depicted in the measurement visualization 170 exceeds some threshold, as defined by the user as described above, the visualization manager 40 may generate additional commands to send to the respective thin-client device 26 to access the remote source to present an updated visualization 180 within the measurement visualization 170, as depicted in FIG. 11. The additional measurement visualization 180 may depict a graphic that illustrates a value approaching a threshold.

Figure 12:
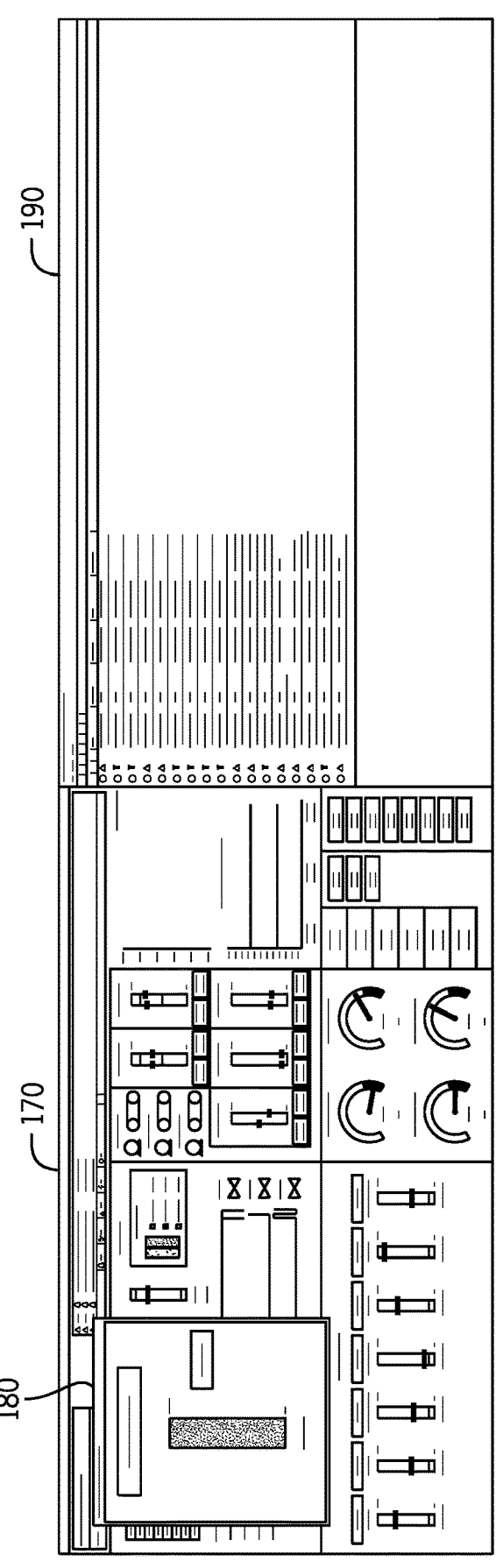
FIG. 12 is an example graphical user visualization of electronic signature settings for the deployed visualization content, in accordance with embodiments described herein.

In some embodiments, after reaching the threshold, a match condition may be defined to instruct the thin-client device 26 to access the remote source to present a tiled view of multiple visualizations as depicted in FIG. 12. The example visualization of FIG. 12 illustrates the measurement visualization 170 with the additional measurement visualization 180 presented adjacent to terminal visualization 190, which may provide details related to the alarm condition. It should be understood that any suitable additional visualization or multiple additional visualizations may be provided in a tiled configuration if specified by the user. For instance, in some embodiments, the measurement visualization 170 may be presented along with a video feed of the machine 12 or other equipment. In other embodiments, the additional visualization may include visual basic code or other computer-executable code that corresponds to the alarm condition or match condition being detected.

Referring back to block 96, if the user does not select to add the new event-based trigger, the visualization manager 40 may proceed to block 110 and receive match conditions for the pre-defined event-based triggers that may be previously generated by the user via a database or other suitable storage. The visualization manager 40 may then receive visualization content for the pre-defined event-based triggers in the similar fashion as described above with reference to block 102. After receiving the visualization content, the visualization manager 40 may proceed to block 104 and monitor the respective channels for the match conditions.

With the foregoing in mind, the visualization manager 40 may receive and store the match conditions established by a number of users in a database. Over time, the visualization manager 40 may identify certain match conditions that are used more than a threshold amount of times. In addition, the visualization manager 40 may identify certain visualization contents that is associated with certain match conditions. If a certain percentage of combinations of visualization contents and match conditions are common, the visualization manager 40 may identify those combinations as well. In addition, the visualization manager 40 may track other event-based trigger information described herein as they are employed by a variety of users for the same machines 12, different machines 12, and the like.

After tracking and storing the event-based trigger data, the visualization manager 40 may employ certain machine learning algorithms to identify patterns and/or correlations between users, machines, industrial systems, event-based triggers, and other aspects described above. Using the identified patterns and correlations, the visualization manager 40 may generate recommendations to users for match conditions based on the user's information, such a type of user, an industry in which the user operates, the type of machinery managed by the user, and the like. In this way, the visualization manager 40 may apply machine learning techniques to provide recommendations that are generated based on user-specific usage, preferences, and the like.

Keeping this in mind, in some embodiments, the visualization manager 40 may monitor applications that are regularly launched on servers by operators after HMI alarms are triggered or launched by specific operators, groups, or in individuals designated with certain roles in physical locations. In addition, the visualization manager 40 may detect specific applications being used when collaborating with a member of a specific group. These relationships and correlations may be monitored and tracked by the machine learning techniques to provide recommendations for particular visualization content 22 or the like for various other users that may be predicted to find the provided content useful.

In addition to determining match conditions and visualization content combinations, the visualization manager 40 may also track the manner in which the visualization content 22 is presented by the thin-client device 26. As such, the visualization manager 40 may automatically present the visualization content 22 via the thin-client device 26 in a particular arrangement, proportion, size, and the like based on the commonly identified patterns in which other like users have presented the visualization content 22.

Control Code Correction and Pinpointing

With the foregoing in mind, the present embodiments may also include incorporating an object server to identify a rung of code being executed by one or more applications associated with a triggered event or the like. Indeed, the visualization manager 40 may cross reference the event-based trigger information with the object server based on any tags that may be present in the event-based trigger information. In this way, the visualization manager may identify control code being executed by an application and allow a user to dynamically update the control code in a design environment. That is, the visualization manager may engage a software suite (e.g., Studio 5000) that provides an integrated environment for visualizing, configuring, and/or programming control code executed by industrial controllers or control systems in response to detecting the event-based trigger.

In some embodiments, the visualization manager 40 may detect a control tag being passed from a first application (e.g., application services) into a second application or design environment and provide the user with the ability to dynamically navigate to a visualization representative of a rung of code, a line of structured text, a sequential function chart, or a function block associated with the control tag in an efficient manner without performing extensive queries to determine the location of the relevant code. That is, if the monitored tag meets some user defined condition, the visualization manager 40 may identify the associated instance of the tag in a design environment (e.g., Studio 5000) and present a visualization or application of the related portion of the design environment having the tag based on the data stored in the object database. In some embodiments, the visualization manager 40 may launch the design environment software tool and navigate to the instance of code that corresponds to the event (e.g., trigged the alarm) associated with the control tag. As such, the visualization manager 40 may prescriptively, with intent of troubleshooting a system, provide diagnostic information to the user to illustrate a location within the logic code that the event occurred without the user having background or understanding of the entire controller code.

It should be noted that the visualization manager 40 does not merely provide a static view of the relevant code. Instead, the visualization manger 40 dynamically navigates into an existing application that is used for design time and provides the user with a design time capability for performing additional analysis of the data related to the tag, such as the ability to trend on a tag, to cross reference a tag, and the like. Further, the additional design time application executed is separate from the thin-client HMIs being presented. That is, the visualization manager 40 is executing the separate design time application that is not native in the thin-client HMI.

In other words, the visualization manager 40 may initiate a separate session that locates and executes or instantiates a particular application associated with the detected event based on a control tag associated with the event and an object server that tracks relationships between the tags and the relevant applications that employ the tags. The visualization manager 40 may then engage a software design tool application to locate the appropriate portion of a control block or code to present the design time environment of the respective code associated with the respective tag annunciation. The visualization manager 40 may present the application being executed in a tile view or other suitable view for the user to review, modify, or perform additional operational tasks.

In some embodiments, the visualization manager 40 passes the event data to the thin-client or other device via an ActiveX connection, thereby causing the other device to identify the control code or logic that associated with the event. In this way, the visualization manager 40 does not actively perform any analysis or processing related to the event. Instead, the thin-client device may perform the appropriate actions. Additional details with regard to identifying and presenting control code or functional code blocks related to triggered events will be discussed below with reference to FIGS. 13 and 14.

With this in mind, FIG. 13 is a flow chart of a method 200 for accessing control code associated with an event, the event-based trigger, or the like, in accordance with embodiments described herein. Although the following description of the method 200 is described in a particular order and being performed by the visualization manager 40, it should be understood that the method 200 may be performed in any suitable order and by any suitable device.

Referring now to FIG. 13, at block 202, the visualization manager 40 may receive an indication of an event-based trigger being present. In some embodiments, the visualization manager 40 may receive the indication by monitoring various communication channels for alerts, alarms, and the like. The event-based trigger may correspond to the predefined event-based trigger, new event-based trigger, or other suitable triggers described above.

At block 204, the visualization manager 40 may identify one or more tags or objects associated with the detected event-based trigger. That is, the event-based trigger may correspond to event-based trigger information provided by a user or entity at some time. For example, each of the graphical user visualizations depicted in FIGS. 5-12 provide some samples of tag data or object data that may be identified based on the detected event-based trigger. In some embodiments, the event-based trigger may be communicated via a packet including metadata that includes tag data that describes the event or provides context with regard to the respective event.

At block 206, the visualization manager 40 may query a tag server (e.g., devices 44) or database to identify applications or devices executing software or code associated with the event-based trigger. That is, the tag server may store associations between tags related to events and code logic of applications that caused the event-based trigger to be activated. In some embodiments, the tag data may include a reference to control logic or other software being executed by an application, such that the reference may enable the visualization manager 40 to access a device or computing system that is instantiating the control code. In addition, the visualization manager 40 may access design software to view the control code that caused the event-based trigger to be instantiated or activated. The visualization manager 40 may thus provide a user the ability to modify control code associated with the event-based trigger via a design environment.

In some embodiments, the visualization manager 40 may leverage a fairly tight coupling between applications or devices executing software or code associated with the event-based trigger and the software design tool (e.g., Studio 5000). That is, the visualization manager 40 may identify a specific project at runtime based on a detected event or event parameter. In a general sense, the applications or devices executing software or code associated with the event-based trigger may access an interface that may provide access to the application that the visualization manager 40 may navigate within to identify the appropriate control code associated with the event. In some embodiments, the interface may be performed via an automation interface, such as the software design tool (e.g., Studio 5000), or some other interface, like an application programming interface (API), a software development kit (SDK), or the like.

At block 208, the visualization manager 40 may retrieve a list of applications that may be associated with the tag provided at block 204. That is, the tag server may identify a number of applications that are associated with the tags. Moreover, the tag server may also track the applications that are currently active, accessing communication channels, or the like. Based on the list of applications associated with the tags, at block 210, the visualization manager 40 may identify an application that is associated with the event-based trigger. That is, the visualization manager 40 may cross reference applications provided by the tag server with the devices, software, or applications accessing the communication channels connected to the visualization manager 40. In some embodiments, the visualization content provided to the visualization manager 40 may include metadata or other information that details an application that originates the alert.

At block 212, the visualization manager 40 may send an instruction to a thin client device that is executing the application to present the control logic or code associated with the event-based trigger. That is, the command may cause the thin-client device to execute design software or present a design time environment in which control code being executed or deployed on logic controllers may be dynamically modified or updated. Indeed, the design software may navigate to a visualization representative of the respective control block, functional block, or other relevant part of the respective application causing the application to generate the event-based trigger.

At block 214, the visualization manager 40 may receive the visualization content representative of the executed design software or design environment generated by the thin client device. In addition, at block 216, the visualization manager 40 may receive function data that corresponds to analysis functions (e.g., trend analysis, average, statistics) that may be performed on the dataset that triggered the event. That is, the visualization content provided by the thin client device may include input functions that may modify the control code to perform additional analysis or operations on the respective data. In some embodiments, the input functions may be associated with the respective control code, defined in the design time environment for the respective datasets, or the like. In addition, certain datasets may be associated with specific analysis functions as determined using machine learning algorithms that track user function requests over time for various datasets.

At block 218, the visualization manager 40 may present the visualization content of the design environment with the functions via an electronic display or the like. As such, the user may view the control code associated with a particular event-based trigger and dynamically perform modifications to the control code to adjust the event-based trigger conditions. In this way, the user may not be present at a computing device or system that has access to the design environment for viewing or modifying the control code. Indeed, a user with limited coding experience may now navigate to the appropriate control code associated with the event-based trigger via the visualization manager 40 by interacting with the generated visualization.

Figure 14:
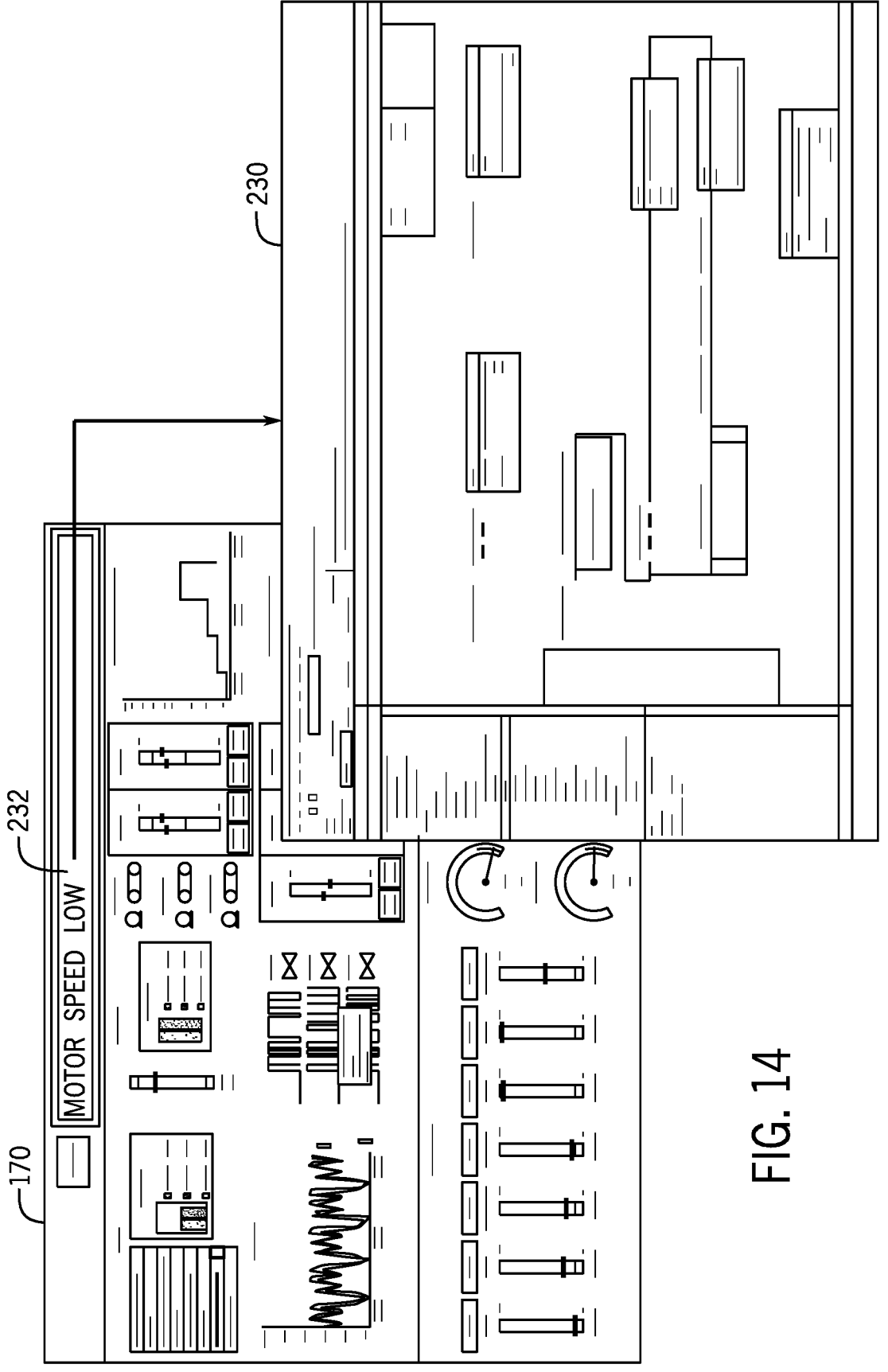
FIG. 14 is an example graphical user visualization of a software design tool presenting the control code accessed in the method of FIG. 13, in accordance with embodiments described herein.

By way of example, FIG. 14 illustrates an example design time environment visualization 230 that depicts function blocks associated with an event-based trigger 232 depicted in the measurement visualization 170. In some embodiments, the visualization manager 40 may automatically present the design time environment visualization retrieved from the respective thin client device in response to detecting the event-based trigger as described above with the method 200. In other embodiments, the user may select an input or option via the visualization presented by the visualization manager 40 to present the respective control code.

At block 220, the visualization manager 40 may receive an input from the user indicative of a selection of a function to apply to the respective datasets. Based on the selected function, the visualization manager 40 may send an instruction to the respective thin client device to adjust the control code or instantiate a different functional block or code to perform the respective analysis. At block 224, the visualization manager 40 may present an updated visualization of the analyzed data as received from the thin client device.

Deploying Containers for Hosting Visualization Content

In some embodiments, the thin client devices may include computational surfaces (e.g., processors, memory, storage) that may be dynamically updated to operate and execute certain applications delivered via containers. That is, the visualization manager 40 may deploy containers to thin client devices, such that the containers for executing various HMI applications, generating different types of visualization content 22, or the like. Indeed, in some embodiments, based on the user defined events or other events, the visualization manager 40 may deploy particular containers to certain thin client devices to generate specific visualization content 22 or access different visualization content generating devices to present the respective visualization content 22. In this way, the thin client devices may not maintain, execute, or store the visualization applications that may be associated with a wide variety of events. Instead, the visualization manager 40 may operate as a container orchestration system to deploy visualization containers to thin client devices that correspond to those defined in the respective events.

In some embodiments, the deployed container may execute at runtime via the thin client device as a web-based container. As such, manufacturing execution systems (MES), enterprise resource planning (ERP) systems, and other web-based systems may provide web-based design environments that provide visualization content 22 to the deployed containers to visualize client-side dashboards and the like. By deploying visualization containers as described herein, the outputs of different HMI applications can be deployed to different containers executed in a thin client device, without the respective thin client device being preloaded with software for executing different visualization applications. In addition, these HMI applications may be executed or run locally via a separate device and the visualization content 22 may be streamed to the thin client devices via other containers in a consistent way regardless of the size (e.g., 1 client to 1000 clients) and scope of the user or industry.

In addition, by providing the ability deploying containers via a container orchestration system, the visualization manager 40 or other suitable component may also deploy other containers that may perform additional computational tasks (e.g., management, analysis) to edge devices via an orchestration layer. That is, the visualization manager 40 or other management applications may be distributed to edge devices for more efficient processing and network communication schemes. With this in mind, deploying manager containers to available resources may enable thin client device to perform other locally hosted functionalities, such as data collection, small engine data compute, and the like.

By way of example, the deployed containers may have the option to run locally to the thin client devices. In this way, if the thin client device has available resources, it can run the container without local storage. That is, the container may be executed via in memory instead of off of hardware storage. In some embodiments, the thin client device may also operate as a container host that may be initialized from another thin client device to retrieve containers for other applications. Additional details with regard to deploying containers in thin clients will be discussed below with reference to FIGS. 15-20.

Figure 15:
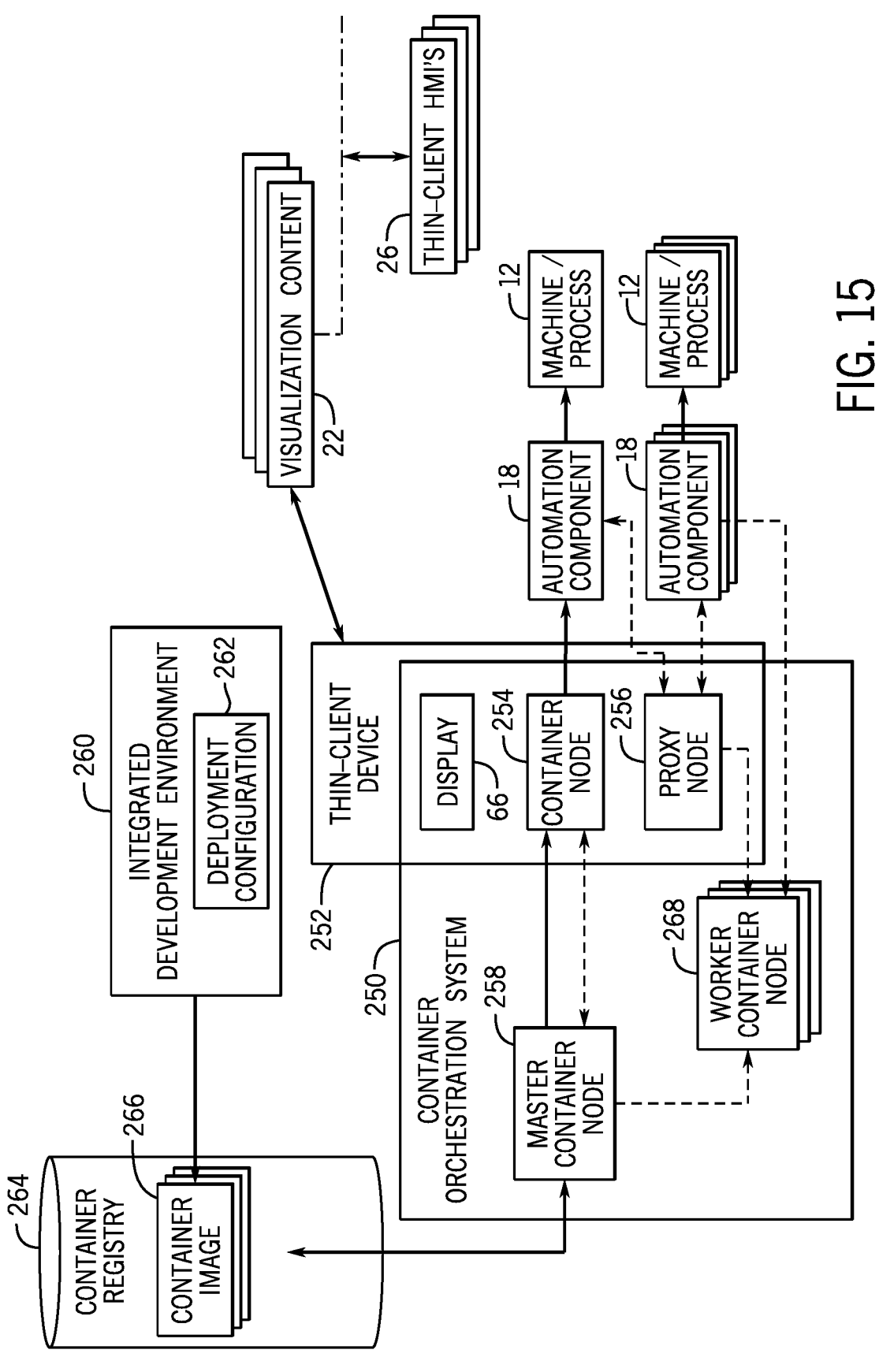
FIG. 15 is a block diagram of implementing a container orchestration system with thin-client devices, in accordance with embodiments described herein.

With the foregoing in mind, FIG. 15 illustrates a block diagram of some embodiments of the industrial automation system 10 including thin client device 252 (e.g., thin client HMI 26) disposed between a container orchestration system 250, which may be implemented by the visualization manager 40, and the machine or process systems 12 (e.g., the industrial automation system 10). The thin client device 252 may include a container node 254 and a proxy node 256 integrated between container orchestration system 250 and the automation components 18. The proxy node 256 may provide bi-directional coordination between the IT space and the OT space. For instance, the container node 254 operating as the proxy node 256 may intercept orchestration commands and cause automation components 18 to implement appropriate machine control routines based on the commands. The automation components 18 may confirm the machine state information of the machine/process systems 12 to the proxy node 256, which may then reply to the master node 258 of the container orchestration system 250 on behalf of the respective devices.

In some embodiments, the container orchestration system 250 may include worker container nodes 268 may corresponds to other container nodes 258 that are communicatively coupled to other control systems for controlling other devices. In this way, the proxy node 256 may translate or forward commands directly to other control systems via certain OT communication protocols or indirectly via the other worker container nodes 268 associated with the other control systems.

In any case, the thin client device 252 may provide visibility into operations of automation components 18 and the machine and process systems 12 to container orchestration system 250 (e.g., visualization manager 40).

In some embodiments, the container orchestration system 250 may operate in an information technology (IT) environment, as opposed to an operational technology (OT) environment in which the automation components 18 may operate. As such, the container orchestration system 250 may include a cluster of multiple computing devices that coordinates an automatic process of managing or scheduling work of individual containers for applications within the computing devices of the cluster. In other words, the container orchestration system may be used to automate various tasks at scale across multiple computing devices.

By way of example, the container orchestration system 250 may automate tasks such as configuring and scheduling of containers, provisioning and deploying containers, determining availability of containers, configuring applications in terms of the containers that they run in, scaling of containers to equally balance application workloads across an infrastructure, allocating resources between containers, performing load balancing, traffic routing, and service discovery of containers, performing health monitoring of containers, securing the interactions between containers, and the like. In any case, the container orchestration system 250 may use configuration files to determine a network protocol to facilitate communication between containers, a storage location to save logs, and the like. The container orchestration system 250 may also schedule deployment of containers into clusters and identify a host (e.g., node) that may be best suited for executing the container. After the host is identified, the container orchestration system 250 may manage the lifecycle of the container based on predetermined specifications.

As mentioned above, the container orchestration system 250 may include a collection of nodes that are used to achieve a desired state of one or more containers across multiple nodes. As shown in FIG. 15, the container orchestration system 250 may include a master node 258 that may execute control plane processes for the container orchestration system 250. The control plane processes may include the processes that enable the container orchestration system 250 to coordinate operations of the container nodes 254 to meet the desired states. As such, the master container node 258 may execute an applications programming interface (API) for the container orchestration system 250, a scheduler component, core resources controllers, and the like.

By way of example, the master container node 258 may coordinate all of the interactions between nodes of the cluster that make up the container orchestration system 250. Indeed, the master container node 258 may be responsible for deciding the operations that will run on container nodes 254 including scheduling workloads (e.g., containerized applications), managing the workloads' lifecycle, scaling, and upgrades, managing network and storage resources for the workloads, and the like. The master container node 258 may run an API server to handle requests and status updates received from the container nodes 254.

By way of operation, an integrated development environment (IDE) tool 260 may be used by an operator to develop a deployment configuration file 262. The deployment configuration file 262 may include details regarding the containers, pods for the containers, constraints for operating the containers/pods, and other information that describe a desired state of the containers specified in the deployment configuration file 260. In some embodiments, the deployment configuration file 262 may be generated in a YAML file, a JSON file, or other suitable file format that is compatible with the container orchestration system 24. After the IDE tool 260 generates the deployment configuration file 262, the IDE tool 260 may transmit the deployment configuration file 262 to a container registry 264, which may store the file along with container images 266 representative of the containers stored in the deployment configuration file 65.

In some embodiments, the master container node 258 may receive the deployment configuration file 262 via the container registry 264, directly from the IDE tool 260, or the like. The master container node 258 may use the deployment configuration file 262 to determine a location to gather the container images 266, determine communication protocols to use to establish networking between container nodes 254, determine locations for mounting storage volumes, locations to store logs for the containers, and the like.

Based on a desired machine state provided in the deployment configuration file 262, the master container node 258 may deploy containers to the container host nodes 254. That is, the master container node 258 may schedule the deployment of a container based on constraints (e.g., CPU or memory availability) provided in the deployment configuration file 262. After the containers are operating on the container nodes 254, the master container node 258 may manage the lifecycle of the containers to ensure that the containers specified by the deployment configuration file 262 is operating according to the specified constraints and the desired state.

Keeping the foregoing in mind, the machine and process systems 12 and the automation components 18 of the industrial automation system 10 may not use an operating system (OS) that is compatible with the container orchestration system 250. That is, the container orchestration system 250 may be configured to operate in the IT space that involves the flow of digital information. In contrast, the industrial automation system 10 may operate in the OT space that involves managing the operation of physical processes and the machinery used to perform those processes. For example, the OT space may involve communications that are formatted according to OT communication protocols, such as FactoryTalk Live Data, EtherNet/IP, Common Industrial Protocol (CIP), OPC Direct Access (e.g., machine to machine communication protocol for industrial automation developed by the OPC Foundation), or any suitable OT communication protocol (e.g. DNP3, Modbus, Profibus, LonWorks, DALI, BACnet, KNX, EnOcean). Because the automation components 18 that operate in the OT space, the machine and process systems 12 may not be capable of implementing IT commands received via the container orchestration system 250.

In certain embodiments, the container node 254 may be programmed or implemented in the thin client device 252 to serve as a node agent that can register the automation component 18 or the machine/process system 12 with the master container node 258. For example, the automation component 18 may include a programmable logic controller (PLC) that may support an OT communication protocol or an operating system (e.g., Linux) for receiving and/or implementing OT commands indicating requested operations issued by the container orchestration system 250. However, the PLC may perform certain operations that may be mapped to certain container events. As such, the container node 254 may include software and/or hardware components that may map certain events or IT commands (e.g., software commands, software instructions) received from the master container node 258 to OT commands to cause the PLC to perform actions. For example, the container node 254 may generate the OT commands based on the IT commands.

After converting the received IT command into an OT command interpretable by the PLC, the container node 254 may forward the mapped OT command to the PLC (e.g., automation component 18) that may implement the mapped OT command. As such, the container node 254 may operate as part of the cluster of nodes that make up the container orchestration system 250, while the automation component 18 (e.g., PLC) may coordinate the OT operations for the machine/process system 12 in the industrial automation system 10. The automation component 18 may include a controller, such as a programmable logic controller (PLC), a programmable automation controller (PAC), or any other controller that may monitor, control, and operate an industrial automation device or component.

Figure 16:
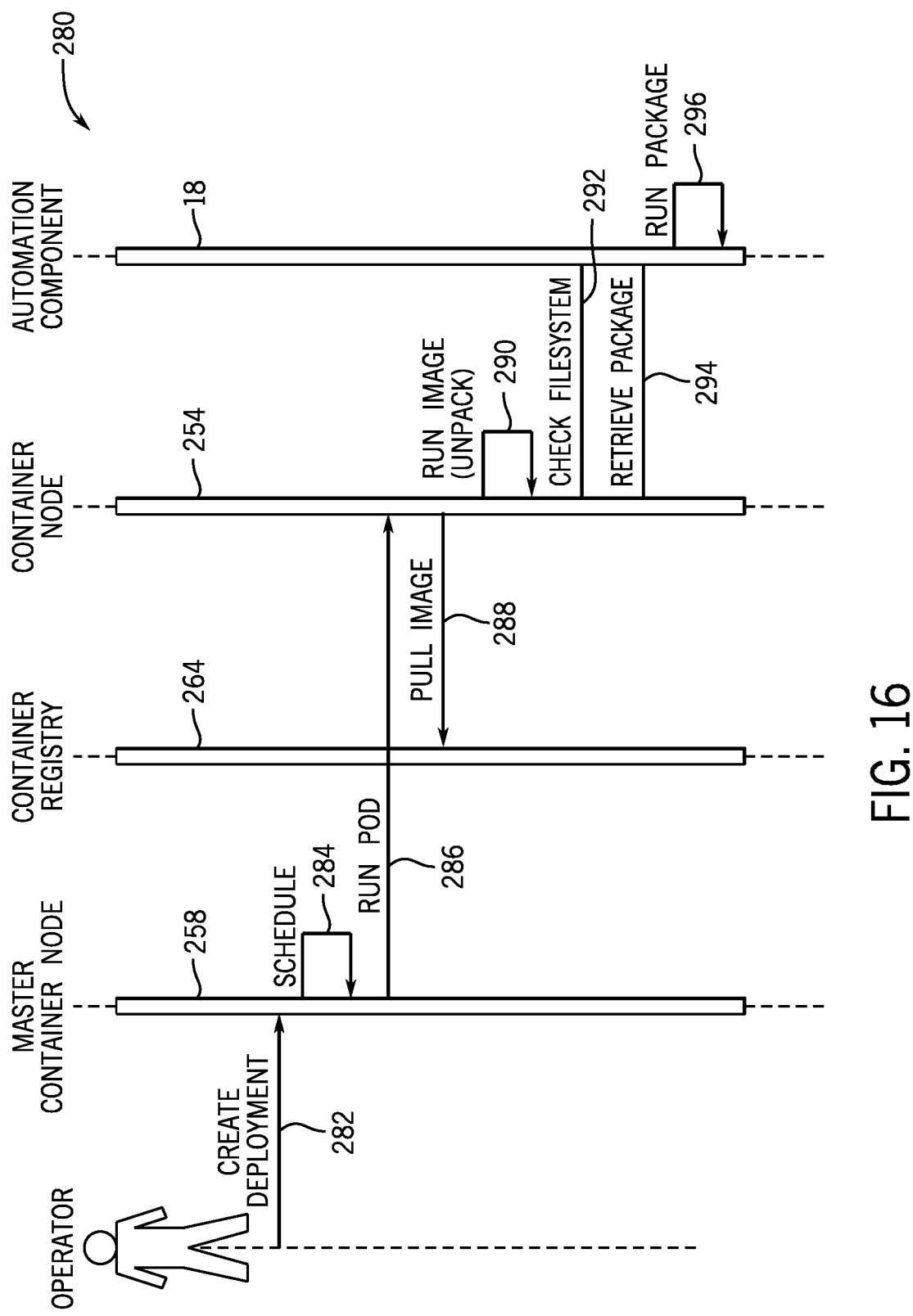
FIG. 16 is a data flow diagram illustrating the deployment of container pods to thin client devices, in accordance with an embodiment.

With the forgoing in mind, FIG. 16 illustrates a data flow diagram for operating the container orchestration system 250 to control functions of the OT network. That is, FIG. 16 illustrates a data flow diagram 280 that tracks the deployment of a container using the master container node 258 and the container node 254 described above with reference to FIG. 15. At step 282, the IDE tool 260 or other suitable device may create a deployment of the deployment configuration file 262 to the master container node 258. The deployment of the deployment configuration file 262 may be initiated based on the detection of an event-based trigger or the like. As such, the master container node 258 may retrieve the deployment configuration file 262 in response to detecting the event-based trigger. After receiving the deployment configuration file 262, the master container node 258 may identify a container node 254 that may fit the constraint specifications (e.g., memory, CPU availability) provided in the deployment configuration file 262. That is, the master container node 258 performs scheduling operations that involve checking the state data for each node of the container orchestration system 250, determining whether a suitable node exists for the constraints provided in the deployment configuration file 262, and the like. In some embodiments, the master container node 258 may query the machine states (e.g., memory, processing power, CPU usage) of different thin client devices 252 to identify the suitable node.

After identifying the suitable container node, at step 284, the master container node 258 may schedule the deployment of the container to the respective container node 254. At step 286, the master container node 258 may deploy a pod to the container node 254, which may cause the container node 254 to retrieve a container image 266 that is specified in the deployment configuration file 262 from the container registry 264 at step 288. In this way, the container node 254 may receive pods from the master container node 258 and execute the pods to cause the container node 254 to pull the container image 266. After pulling the container image 266 from the container registry 264, the container node 254 may, at step 290, run the container image 266 or unpack the container image 266 and store an application or operation executable by the thin client device 252. At step 292, the automation component 18 may check the file system of the container node 254 for updates or newly stored packages. At step 294, the automation component 18 may retrieve the stored package that may include the container scheduled for operation by the automation component 18 by the master container node 258 at step 294. At step 296, the automation component 18 may execute the package retrieved from the file system of the container node 254. The container node 254 may then monitor the operations of the package being executed on the automation component 18. By way of example, the package executed by the automation component 18 may access datasets that may be used to generate visualization content 22 as described above. The automation component 18 may then provide the datasets to the container node 254, which may generate the visualization content 22. The thin client device 252 may transmit or stream the generated visualization content 22 to the thin-client HMIs 26 as described above. However, by employing the container orchestration system 250 described above, thin-client devices 252 may be identified and used to execute visualization applications based on event-based triggers, as opposed to continuously generating the content. As a result, the thin-client devices 252 may be preserved for efficient computational operations.

By employing the container orchestration system 250 described above, the present embodiments may allow thin-client devices 252 to generate the visualization content 22 based on available computing resources, desired machine states, and the like. As a result, thin-client HMIs 26 may stream the generated visualization content 22 provided by the thin-client device 252 in accordance to embodiments described above while efficiently utilizing the available computing resources of the thin-client device 252 capable of generating the visualization content 22.

Figure 17:
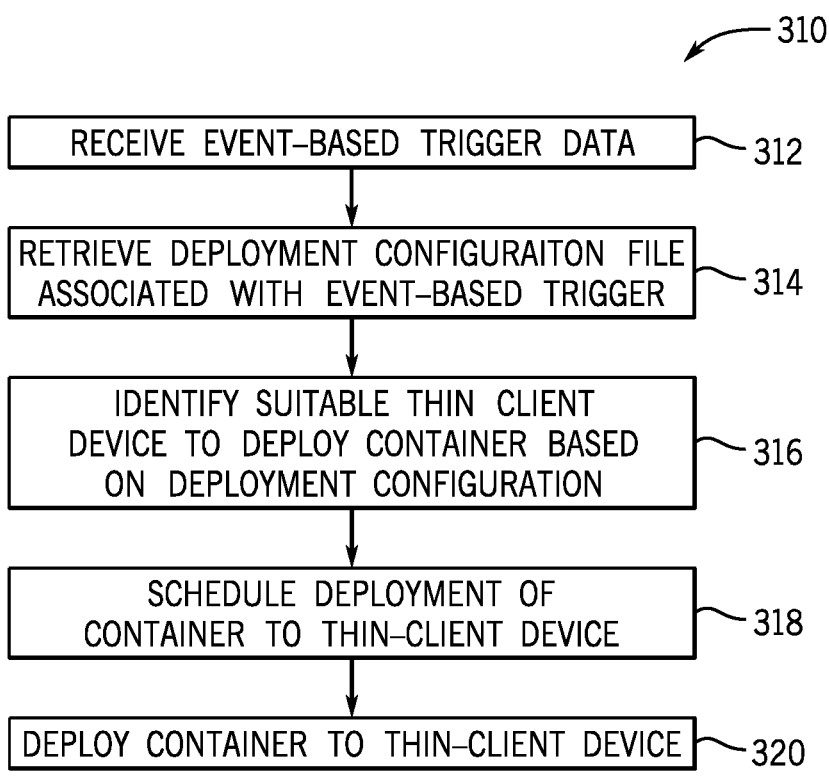
FIG. 17 is a flow chart of a method for the visualization management system to deploy containers to thin-client devices via the control orchestration system, in accordance with an embodiment.

With this in mind, FIG. 17 illustrates a method 310 in which the visualization manager 40, in some embodiments, perform operations as the container orchestration system 250 described above. In particular, the method 310 includes a process for identifying a container and a suitable thin-client device 252 for executing an application related to the event-based trigger data detected by the visualization manger 40. Although the following description of the method 310 is discussed as being performed in a particular order and by the visualization manager 40, it should be noted that the method 310 may be performed by any suitable computing device capable of performing the tasks related to the container orchestration system 250.

Referring now to FIG. 17, at block 312, the visualization manager 40 may receive an event-based trigger data or information as described above. The event-based trigger data may correspond to match conditions being present to trigger the respective event, visualization content 22 associated with the respective event, and the like. In some embodiments, the event-based trigger data may also include an indication or reference to a deployment configuration file 262 associated with the respective event. As such, the user may define the deployment configuration file 262 using the method 90 described above. The deployment configuration file 262 may provide details with regard to desired machine state parameters (e.g., available memory, CPU usage, network latency to other devices) for thin-client devices to execute certain applications, visualization content 22 to be generated, applications (e.g., containers images 266) for generating the visualization content 22, and the like.

At block 314, the visualization manager 40 may retrieve the deployment configuration file 262 that may be specified by the event-based trigger data from the container registry 264, a database, or other suitable storage component. In some embodiments, the deployment configuration file 262 may be retrieved by the visualization manager 40 in response to detecting the event-based trigger and identifying the deployment configuration file 262 associated with the respective event-based trigger.

It should be noted that the deployment configuration file 262, the container image 266, and other related factors for generating the visualization content 22 may be defined by the user or generated using machine learning parameters, as described above. In some embodiments, as users specify particular containers for generating certain types of visualization content 22 in response to detecting certain events, the visualization manager 40 may automatically update deployment configuration files 262 for other visualization mangers 40 to deploy similar containers. That is, if the visualization manager 40 detects that a threshold percentage of users deploy a particular container in response to a particular detected event, the visualization manager 40 may notify other visualization managers 40 or devices to perform the same deployment.

As mentioned above, the deployment configuration file 262 may include information related to applications or container images 266 associated with applications that may generate the visualization content 22 corresponding to the event-based trigger. In addition, the deployment configuration file 262 may provide a range of available computational parameters or resources that the visualization manager 40 may use to identify a suitable thin-client device 252 to execute the application. As such, the visualization manager 40 may include the master container node 258 to query the available thin-client devices 252 and identify a suitable thin-client device 252 to deploy the respective container image 266. In some embodiments, the master container node 258 may maintain a table or collection of status of computing resources available for the connected thin-client devices 252 and may periodically update the table based on data received from the respective devices.

At block 316, the visualization manager 40 may identify the suitable thin-client device 252 to deploy the respective container. That is, the identified thin-client device 252 may be under-utilized, as compared to other thin-client devices, and may be well suited to generate the visualization content 22 associated with the event-based trigger. Indeed, the range of computing resource data (e.g., memory, CPU usage, currently executed applications) specified in the deployment configuration file 262 may enable the visualization manager 40 to identify the suitable thin-client device 252.

After identifying the suitable thin-client device 252, the visualization manager 40 may, at block 318, schedule deployment of the associated container to the identified thin-client device 252. As such, the master container node 258 of the visualization manager 40 may coordinate the deployment of the container or associated pod to the identified thin-client device 252 based on a time or time period in which the thin-client device 252 may meet the specified computational parameters. At block 320, the visualization manager 40 may deploy the container or pod to the thin-client device 252, such that the thin-client device 252 or the container node 254 of the thin-client device 252 may execute the corresponding application to generate the respective visualization content 22.

Figure 18:
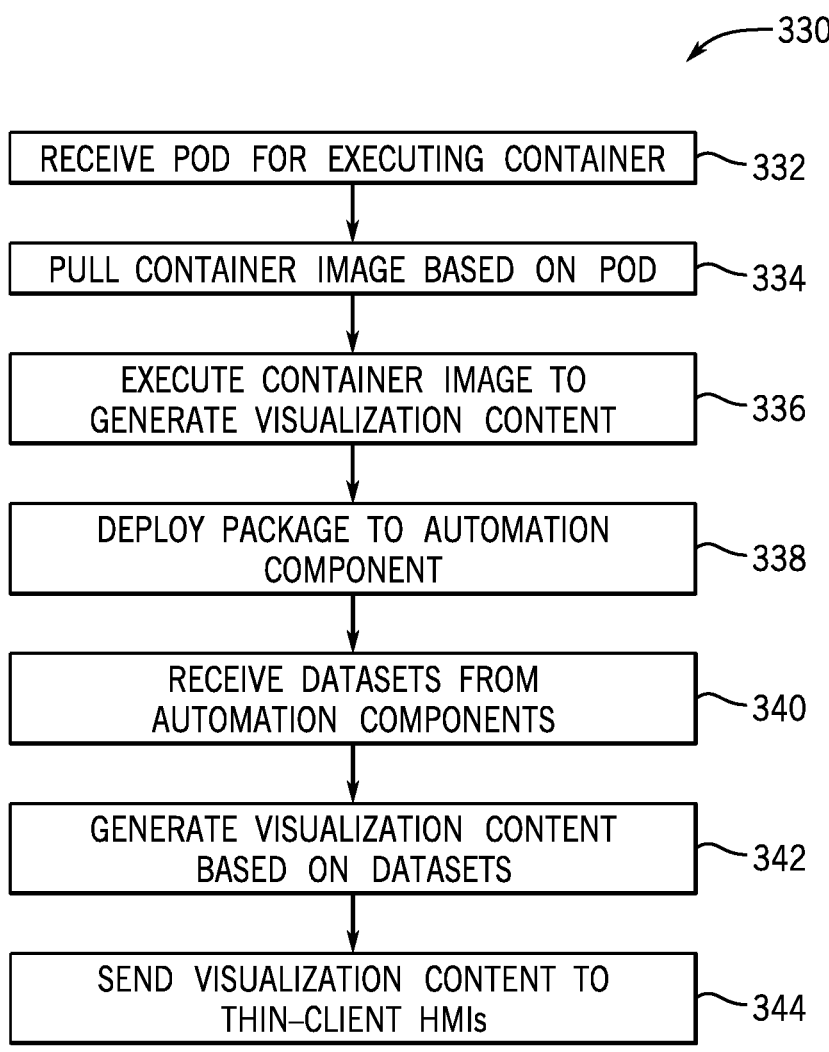
FIG. 18 is a flow chart of a method for the thin-client devices to implement commands received via the control orchestration system, in accordance with an embodiment.

With the foregoing in mind, FIG. 18 illustrates a method 330 in which the container node 254 of the thin-client device 252 identified in the method 310 may execute the container received via the visualization manager 40 or other suitable container orchestration system 250. Although the method 330 is described in a particular order, it should be understood that the method 330 may be performed in any suitable order.

Referring now to FIG. 18, at block 332, the container node 254 may receive the pod for executing the deployed container from the visualization manager 40. The pod may include instructions that point (e.g., pointer) to a container image 266 associated with the container deployed by the visualization manager 40. By storing the container image 266 in the container registry 264 and providing instructions to pull the container image 266, the master container node 258 and/or the container node 254 may retrieve the respective container image 266 when requested to execute the respective application. That is, the application or container does not use computing resources of the visualization manager 40, the thin-client device 252, or other computing surface until it is being instantiated.

At block 334, the container node 254 may pull or retrieve the respective container image 266 from the container registry 264 based on the information provided by the pod. At block 336, the container node 254 may execute the container image 266, which may include computer/processor-executable instructions that cause the respective computing resources (e.g., processor, memory) to generate visualization content 22 for display via thin-client HMIs 26.

In some embodiments, the executed container image 266 may employ data sets from automation controllers 18, machine/process systems 12, or other OT devices to generate the respective visualization content 22. As such, at block 340, the container node 254 may receive datasets from the respective OT devices. The thin-client device 252 may include software, hardware, or other suitable communication devices that enable the container node 254 to interface and communicate with the OT devices (e.g., automation controller 18, machine/process system 12) to retrieve the relevant datasets. The visualization content 22 generated at block 340 may correspond to any suitable visualization, including those described above with respect to FIG. 4. The container image 266 may thus specify particular datasets from industrial devices to acquire for generating the respective visualization content 22.

At block 338, the container node 254 may deploy a software package to a respective industrial device (e.g., OT device) that may cause the respective device to retrieve the respective datasets. After executing the package, the respective industrial devices may send the respective datasets to the container node 254. As such, at block 340, the container node 254 may receive the datasets, such that, at block 342, the container node 254 may generate the visualization content 22 based on the retrieved datasets.

Keeping this in mind, in some embodiments, the pod received at block 332, the container image 266, or another suitable data source provided via the visualization manager 40 may specify one or more thin-client HMIs that is intended to receive the generated visualization content 22. As such, at block 344, the container node 254 may send the visualization content 22 to the thin-client HMIs 26 or other suitable destination devices that may have been specified as described above. Indeed, in some embodiments, the visualization content 22 may be generated by the container node 266 and made available for access by the thin-client HMIs 26. In this way, the thin-client HMIs 26 may access the thin-client device 252 to stream the visualization content 22 generated by the container node 254.

Figure 19:
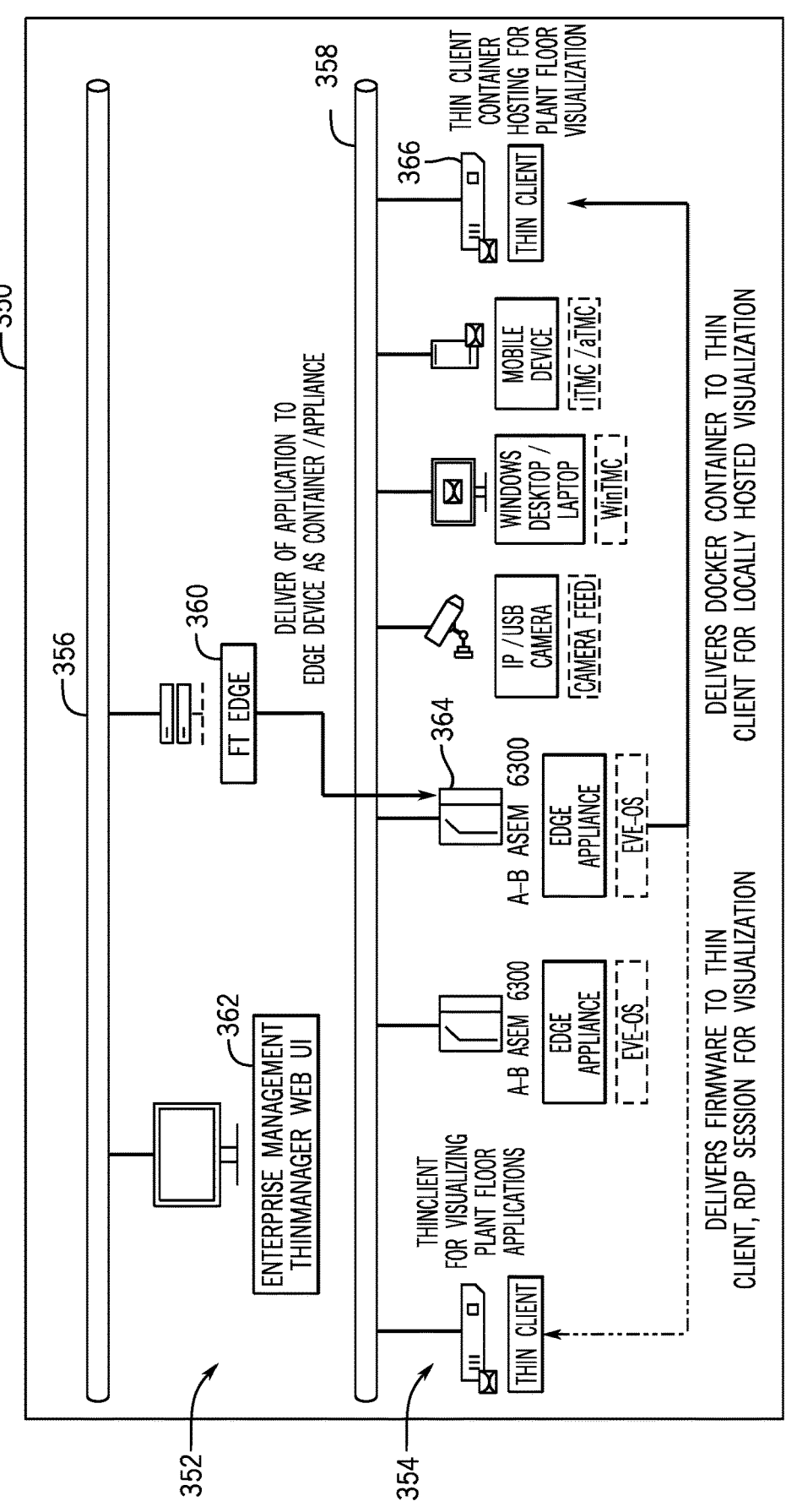
FIG. 19 is a block diagram illustrating a manner in which containers may be deployed to edge devices, in accordance with embodiments described herein.

By employing containers, the present embodiments described herein may efficiently use computing resources across the industrial system 10, as well as coordinate operations between IT and OT spaces. For instance, FIG. 19 illustrates a block diagram of a container deployment system 350 for deploying containers to industrial devices via edge devices (e.g., gateway, routers). In some embodiments, the container deployment system 350 may be distributed between an IT network 352 and an OT network 354. That is, devices connected via communication plane 356 may communicate via IT networks (e.g., Ethernet), while devices connected via communication plane 358 may communicate via an OT network (e.g., ControlNet, EthernetIP).

By way of example, information technology (IT) devices may perform operations such as processing, storing, and transmitting data and information in digital form. IT devices are commonly used in office environments, data centers, and personal computing. They include computers, servers, laptops, tablets, smartphones, networking equipment, storage devices, and other peripherals. IT devices are used for tasks such as data management, communication, software development, data analysis, and general computing needs.

Operational Technology (OT) devices may be used in industrial and infrastructure settings to monitor, control, and automate physical processes. These devices are designed to interact with the physical world, such as machinery, sensors, actuators, and control systems. OT devices are commonly found in sectors like manufacturing, energy, transportation, and utilities. Examples of OT devices include programmable logic controllers (PLCs), industrial control systems (ICS), SCADA (Supervisory Control and Data Acquisition) systems, sensors, actuators, and industrial robots.

Keeping this in mind, the container deployment system 350 illustrates how a container orchestration system may be implemented in an edge device 360, which may be part of the IT network 352 and may interface with an enterprise resource planning (ERP) system 362 or the like. In some embodiments, the containers discussed above may be deployed via the edge device 360, which may serve as a gateway device or router to communicatively couple to the OT network 354. In some embodiments, the edge device 360 may deploy a container to an edge device 364 disposed on the OT network 354. The container may then be routed to an OT device 366, which may correspond to the thin-client device 252 mentioned above.

Selective Distribution of Industrial Thin Client Visualization

In some embodiments, visualizations may be distributed, stored, and managed as shareable files from the thin client device to the visualization manager 40, which may then push the visualizations to a different thin-client device based on a user associated with the different thin-client device. In this way, users across the automation system 10 may be notified or provided with visualizations that may be relevant to them performing their job functions or analysis by providing the visualizations to the thin-client device located within a proximity of the respective users.

In some embodiments, the visualization manager 40 may identify users or thin-client devices that are associated with users designated to view the visualization content 22 generated in response to event-trigger data being present. As such, the visualization manager 40 may store and/or forward the visualization content 22 to a destination thin-client device. The visualization content 22 may include any suitable visualization described above including live streams, video recordings, generated GUIs, and the like.

In some embodiments, multiple events may be defined for the same detected event trigger condition. As such, the visualization manager 40 may direct the resulting visualization content 22 to multiple thin-client devices. That is, instead of predefining the destination terminal or thin-client device associated with the event trigger data, the visualization manager 40 may dynamically select the deployment based on individuals, users, teams, and the like. For example, the visualization manager 40 may send the visualization content 22 to multiple thin-client devices within a proximity of users identified to view the visualization content 22. In other words, the visualization manager 40 may deploy the visualization content 22 based on the user that is designated as appropriate to view it, based on capabilities of the users, and the like. With this in mind, the event may be defined for display to specific individuals or capabilities of individuals, such that the visualization manager 40 may recognize the thin client device that the appropriate user currently logged into or located to deploy the event content. It should be noted that the visualization content 22 can be delivered via the RDS session or any suitable delivery system, such as the container orchestration system described above.

As an extension to the events trigger data described above, the visualization manager 40 or other applications may request authentication information for performing certain actions. As such, the visualization manager 40 may send a request to a thin-client device that requests the user to provide authentication data, which may be used to pass to another application executed on the same terminal or a different terminal. As a result, a generic application may use the same authentication data to consistently authenticate a user across multiple (e.g., different) applications. By way of example, the thin-client device may receive drivers that may be stored on the host device. The drivers may receive authentication data, review the authentication data against an active directory, pass the authentication result to respective application, and the like. Indeed, it should be noted that, in some embodiments, the request for authentication may be initiated on one terminal and sent to another terminal that is expected to receive the authentication data. In this way, co-signatures (or counter signatures) may be acquired via different devices. Additional details with regard to selectively distributing visualization content 22 to the thin-client devices will be discussed below with reference to FIG. 20.

Figure 20:
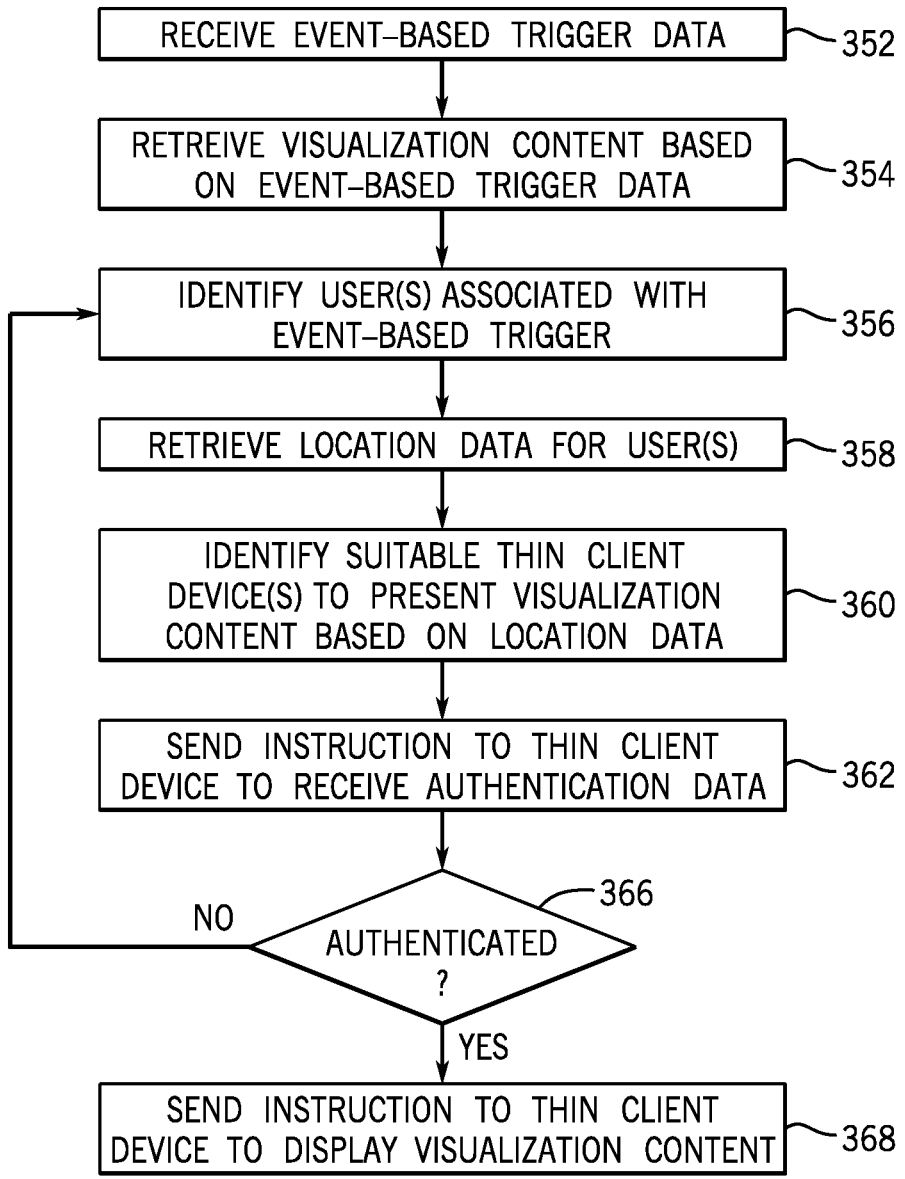
FIG. 20 illustrates a flow chart of a method for selectively distributing visualizations to thin-client devices, in accordance with an embodiment.

FIG. 20 illustrates a flow chart of a method 350 for selectively distributing visualization content to thin-client devices, in accordance with embodiments herein. Although the method 350 is described in a particular order, it should be understood that the method 350 may be performed in any suitable order.

Referring now to FIG. 20, at block 352, the visualization manager 40 may receive an indication of an event-based trigger being present. In some embodiments, the visualization manager 40 may receive the indication by monitoring various communication channels for alerts, alarms, and the like. The event-based trigger may correspond to the predefined event-based trigger, new event-based trigger, or other suitable triggers described above. In addition, it should be noted that the indication of the event trigger, as described in various embodiments herein, may also be received by the visualization manager 40 in a push notification or in a pull-type function from an architectural component executed on the thin-client device to the visualization manager 40.

At block 354, the visualization manager 40 may retrieve the visualization content 22 associated with the event-based trigger data. As such, the visualization manager 40 may retrieve relevant datasets from various devices to generate the visualization content 22, may access the visualization content 22 presented via a remote source, or the like.

At block 356, the visualization manager 40 may identify one or more users or individuals that may be associated with the event-based trigger. That is, the event-based trigger data may include an indication related to a class or type of employees (e.g., management, tier number, maintenance, administrator), may specify specific users or user profiles, and the like, such that the visualization content 22 may be provided to the devices that are associated with the individuals that correspond to the appropriate class, as discussed above.

To determine the visualization content 22, the users or individuals associated with the event-based trigger, and the like, I think we should include some sort of wording that indicates the event trigger may also the event trigger may include information such as a transmitter device identification (e.g., information indicative of the source of the event-based trigger, trigger initiated from Device A vs. Device B). The source information may be relevant with regard to identifying relevant users by the visualization manager 40. In this way, the visualization manager 40 may contextualize the request or the event-based trigger, though it may not be present or known by the visualization manager 40 before receiving the event-based trigger (e.g., when requesting an event from the API, the context of thin-client device may be lost).

After identifying the relevant users, at block 358, the visualization manager 40 may retrieve location data for the identified users. In some embodiments, the location data may be acquired based on sensor data (e.g., image data, video data, biometric data) acquired by sensors disposed in the automation system 10. In addition, the location data may be acquired via location sensors disposed within user devices (e.g., mobile phone, location tags). The location data may also be determined based on user login data. That is, the user may be presumed to be located at a particular thin-client device if the user's credentials were used to log in or access the thin-client device.

Based on the location data for the identified users, at block 360, the visualization manager 40 may identify one or more suitable thin-client devices to present the visualization content 22. That is, the visualization manager 40 may determine whether the location data of the user corresponds to locations of the thin-client devices accessible to the visualization manager 40, whether the location data of the user is indicative of the user being within a proximity (e.g., threshold distance) of the thin-client devices, or the like.

At block 362, the visualization manager 40 may send instructions to the identified thin client devices to receive authentication data. As discussed above, the visualization manager 40 may send a request for an electronic signature to be received via the thin-client device to authenticate the user located at the thin-client device. By way of example, the thin-client device may present a GUI that requests input for manual login (e.g., username/password, security code), card reader (e.g., providing physical card input), biometric (e.g., fingerprint, facial scan, voice authentication), relevance identifier, and the like.

Based on the received input data, the visualization manager 40 may determine whether the user is authenticated at block 366. If the user is authenticated, the visualization manager 40 may proceed to block 368 and send the visualization content 22 to the thin client device as discussed above. If, however, the visualization manager 40 does not determine that the user is authenticated at block 366, the visualization manager 40 may return to block 356. At block 356, the visualization manager 40 may determine whether other identified individuals or users may be associated with the event-based trigger. Alternatively, the visualization manager 40 may send instructions to the identified thin-client device indicative of the unauthenticated user.

By performing the method 350, the visualization manager 40 may dynamically provide the visualization content 22 to different users based on the type of the event-based trigger. In addition, the visualization manager 40 may ensure that the appropriate user is likely to view the visualization content 22. Further, the visualization manager 40 may protect the integrity of the presented visualization by authenticating the user's credentials before providing the visualization content 22.

In some embodiments, the method 350 may be performed with any of the suitable techniques and systems described above. For example, the authentication process and visualization content 22 may be provided via deployed containers as discussed above. Further, the users and authentication processes described with respect to the method 350 may be defined based on the user defined via the software design tool in accordance with the embodiments described above.

In addition, it should be noted that, in some embodiments, users may be automatically added to the event-based trigger data using a machine learning based on previous updates to the event-based trigger data for other event types. That is, if a threshold number of similar users are identified for two or more events, the visualization manager 40 may automatically update the event-based trigger data to include the same users for the two or more events. In the same manner, if users having a similar location or a location within the same threshold when a threshold number of event-based triggers are detected, the visualization manager 40 may automatically update the event-based trigger data to include the same users for the two or more events.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform] ing [a function] . . . " or "step for [perform] ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
a computing system communicatively coupled to a plurality of client devices, wherein the computing system is configured to:
receive an indication of an event-based trigger for deploying visualization content by monitoring a plurality of communication channels for one or more conditions indicative of an event, wherein the indication of the event-based trigger is received via a data packet comprising metadata from at least one communication channel of the plurality of communication channels;
identify one or more tags associated with the event-based trigger within the metadata, wherein the one or more tags define one or more properties of the event;
query a tag server to identify control code associated with activation of the event-based trigger based on the one or more tags;
retrieve visualization content associated with the event-based trigger, wherein the visualization content is generated via a first client device of the plurality of client devices, and the visualization content comprises the control code;
identify a user associated with the event-based trigger based on a plurality of users currently accessing at least a portion of the plurality of client devices;
retrieve location data associated with the user;
identify a second client device of the at least a portion of the plurality of client devices based on the location data;
receive an indication of a third client device of the plurality of client devices associated with an additional user from the second client device;
send a request for authentication data to the third client device, wherein the third client device is configured to render a graphical user interface (GUI) configured to receive user inputs in response to receiving the request;
authenticate the additional user based on the authentication data received from the third client device; and
send the visualization content to the third client device in response to authenticating the additional user.

2. The system of claim 1, wherein the location data is determined based on sensor data, login data, or both.

3. The system of claim 2, wherein the sensor data is acquired by a location sensor associated with the user.

4. The system of claim 1, wherein the computing system is configured to send the visualization content via one or more containers.

5. A non-transitory computer-readable medium comprising computer-executable instructions that, when executed, are configured to cause at least one processor to perform operations comprising:
receiving an indication of an event-based trigger for deploying visualization content by monitoring a plurality of communication channels for one or more conditions indicative of an event, wherein the indication of the event-based trigger is received via a data packet comprising metadata from at least one communication channel of the plurality of communication channels;
identifying one or more tags associated with the event-based trigger within the metadata, wherein the one or more tags define one or more properties of the event;
querying a tag server to identify control code associated with activation of the event-based trigger based on the one or more tags;
retrieving visualization content associated with the event-based trigger, wherein the visualization content is generated via a first client device of a plurality of client devices communicatively coupled to the at least one processor, and the visualization content comprises the control code;
identifying a user associated with the event-based trigger based on a plurality of users currently accessing at least a portion of the plurality of client devices;
retrieving location data associated with the user;
identifying a second client device of the at least a portion of the plurality of client devices based on the location data;
receiving an indication of a third client device of the plurality of client devices associated with an additional user from the second client device;
sending a request for authentication data to the third client device, wherein the third client device is configured to render a graphical user interface (GUI) configured to receive user inputs in response to receiving the request;
authenticating the additional user based on the authentication data received from the third client device; and
sending the visualization content to the third client device in response to authenticating the additional user.

6. The non-transitory computer-readable medium of claim 5, wherein the event-based trigger is defined via an additional graphical user interface configured to receive user input, wherein the user input comprises an identification of a user group comprising the user.

7. The non-transitory computer-readable medium of claim 5, wherein the at least one processor is configured to identify the second client device based on a proximity of a location of the user to the second client device.

8. The non-transitory computer-readable medium of claim 5, wherein the at least one processor is configured to perform the operations comprising sending the visualization content via one or more containers.

9. The non-transitory computer-readable medium of claim 5, wherein the event-based trigger comprises a pre-defined event trigger identified based on one or more machine learning algorithms.

10. The non-transitory computer-readable medium of claim 5, wherein the visualization content is presented in a tile format.

11. A method, comprising:

receiving, via a computing system, an indication of an event-based trigger for deploying visualization content by monitoring a plurality of communication channels for one or more conditions indicative of an event, wherein the indication of the event-based trigger is received via a data packet comprising metadata from at least one communication channel of the plurality of communication channels;

identifying, via the computing system, one or more tags associated with the event-based trigger within the metadata, wherein the one or more tags define one or more properties of the event;

querying, via the computing system, a tag server to identify control code associated with activation of the event-based trigger based on the one or more tags;

retrieving, via the computing system, visualization content associated with the event-based trigger, wherein the visualization content is generated via a first client device of a plurality of client devices communicatively coupled to the computing system, and the visualization content comprises the control code;

identifying, via the computing system, a user associated with the event-based trigger based on a plurality of users currently accessing at least a portion of the plurality of client devices;

retrieving, via the computing system, location data associated with the user;

identifying, via the computing system, a second client device of the at least a portion of the plurality of client devices based on the location data;

receiving, via the computing system, an indication of a third client device of the plurality of client devices associated with an additional user from the second client device;

sending, via the computing system, a request for authentication data to the third client device, wherein the third client device is configured to render a graphical user interface (GUI) configured to receive user inputs in response to receiving the request;

authenticating, via the computing system, the additional user based on the authentication data received from the third client device; and sending, via the computing system, the visualization content to the client device in response to authenticating the additional user.

12. The method of claim 11, wherein the third client device is configured to stream the visualization content via the first client device.

13. The method of claim 11, wherein identifying the second client device comprises determining one or more available computing resources associated with the first client device.

14. The method of claim 13, wherein identifying the second client device comprises selecting the second client device in response to the one or more available computing resources meeting one or more computing resource thresholds.

15. The system of claim 1, wherein the visualization content comprises a design time environment configured to enable the additional user to modify the control code.

16. The system of claim 1, wherein the event-based trigger comprises an indication of a user group authorized to access the visualization content and an indication of one or more allowed authentication methods configured to authenticate members of the user group.

17. The system of claim 16, wherein the computing system is configured to send the request for authentication data based on the one or more allowed authentication methods, and the authentication data comprises login credentials, access card input, biometric data, or a combination thereof.

18. The system of claim 1, wherein the plurality of communication channels are configured to communicatively couple the computing system to a plurality of industrial devices, and the event is associated with an operational status of at least one industrial device of the plurality of industrial devices.

* * * * *